US012580312B2

(12) United States Patent
Hayashi et al.

(10) Patent No.: US 12,580,312 B2
(45) Date of Patent: Mar. 17, 2026

(54) ANTENNA DEVICE

(71) Applicant: PANASONIC AUTOMOTIVE SYSTEMS CO., LTD., Kanagawa (JP)

(72) Inventors: Hideyuki Hayashi, Kanagawa (JP); Satoshi Watanabe, Kanagawa (JP); Hidenobu Kato, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 58 days.

(21) Appl. No.: 18/618,899

(22) Filed: Mar. 27, 2024

(65) Prior Publication Data

US 2024/0332798 A1 Oct. 3, 2024

(30) Foreign Application Priority Data

Mar. 29, 2023 (JP) ................................ 2023-053887

(51) Int. Cl.

| | |
|---|---|
| ***H01Q 1/38*** | (2006.01) |
| ***H01Q 7/00*** | (2006.01) |
| ***H01Q 9/04*** | (2006.01) |

(52) U.S. Cl.

CPC ................ *H01Q 7/00* (2013.01); *H01Q 1/38* (2013.01); *H01Q 9/0414* (2013.01)

(58) Field of Classification Search

CPC .. H01Q 1/38; H01Q 7/00; H01Q 9/04; H01Q 9/0414

See application file for complete search history.

(56) References Cited

U.S. PATENT DOCUMENTS

| | | | | |
|---|---|---|---|---|
| 6,943,731 | B2 * | 9/2005 | Killen | H01Q 9/0457 343/700 MS |
| 7,408,524 | B2 * | 8/2008 | Ogino | H01Q 19/005 343/866 |
| 8,686,916 | B2 * | 4/2014 | Yukimasa | H01Q 1/38 343/866 |
| 9,502,771 | B2 * | 11/2016 | Harper | H01Q 5/364 |
| 11,005,154 | B2 * | 5/2021 | Hung | H01Q 5/385 |
| 11,128,052 | B2 * | 9/2021 | Cohen | G02B 5/008 |
| 11,258,171 | B2 * | 2/2022 | Izawa | H01Q 1/48 |
| 11,476,584 | B2 * | 10/2022 | Cox | H01Q 9/32 |
| 2008/0042917 | A1 | 2/2008 | Seki et al. | |

FOREIGN PATENT DOCUMENTS

| | | | |
|---|---|---|---|
| JP | 63-056005 | A | 3/1988 |
| JP | 2003-188636 | A | 7/2003 |
| JP | 2012-049865 | A | 3/2012 |
| WO | 2006/028136 | A1 | 3/2006 |

* cited by examiner

*Primary Examiner* — Tho G Phan

(74) *Attorney, Agent, or Firm* — Seed Intellectual Property Law Group LLP

(57) ABSTRACT

An antenna device includes a dielectric layer having a dielectric, an antenna element that is located on a surface of the dielectric layer and that has a loop shape, a radio frequency input element configured to supply power to the antenna element, and at least one resonance element that is located inside the dielectric layer.

15 Claims, 17 Drawing Sheets

ANTENNA DEVICE

TECHNICAL FIELD

The present disclosure relates to an antenna device.

BACKGROUND ART

In the related art, microstrip antennas are used in a wireless communication such as Wi-Fi (registered trademark). Such an antenna device can be formed in a relatively small size, and thus is used by being mounted on various devices.

Various configurations of the antenna device have been proposed depending on the required frequency band and the performance thereof. For example, Patent Literature 1 discloses a microstrip antenna having a layer structure in which a plurality of loop-shaped resonance elements have a diameter increasing toward the upper layer. Patent Literature 2 discloses an antenna device in which ring-shaped patch elements are arranged doubly within a plane. Patent Literature 3 discloses an antenna device having a laminated structure in which a plurality of resonance elements are provided, the resonance element in the surface layer has a plate shape, and the resonance element in the inner layer has a loop shape.

CITATION LIST

Patent Literature

Patent Literature 1: WO2006/028136
Patent Literature 2: JP2003-188636A
Patent Literature 3: JP2012-49865A

SUMMARY OF INVENTION

For example, it is assumed that the location where the antenna device as described above is provided is made of a metal material. When the antenna device is directly provided on a metal surface, due to the influence of the metal, it may be difficult to ensure the performance that the antenna device is to originally achieve.

In order to address such a problem, efforts have been made to reduce the influence of the metal by, for example, increasing the thickness of the reflection plate and substrate that constitute the antenna device. However, as a result, the size of the antenna device itself increases, and the difficulty of incorporating the antenna device into a provided device increases. In other words, it has been difficult to simultaneously achieve size reduction and performance improvement of the antenna device.

In view of the above problems, an object of the present disclosure is to provide a configuration that can achieve both size reduction and performance improvement of an antenna device.

The present disclosure provides an antenna device including a dielectric layer including a dielectric, an antenna element that is located on a surface of the dielectric layer and that has a loop shape, a radio frequency input element through which radio frequency is supplied to the antenna element, and at least one resonance element that is located inside the dielectric layer.

Any combination of the above components, and conversion of an expression of the present disclosure between a method, a device, a system, a storage medium, a computer program, and the like are also effective in an aspect of the present disclosure.

According to the present disclosure, it is possible to provide an antenna configuration that can achieve both size reduction and performance improvement of an antenna device.

DESCRIPTION OF EMBODIMENTS

Hereinafter, embodiments specifically disclosing an antenna device according to the present disclosure will be described in detail with reference to the accompanying drawings as appropriate. However, the unnecessarily detailed description may be omitted. For example, the detailed description of well-known matters or the redundant description of substantially the same configuration may be omitted. This is to avoid unnecessary redundancy of the following description and facilitate understanding of those skilled in the art. The accompanying drawings and the following description are provided for those skilled in the art to fully understand the present disclosure, and are not intended to limit the subject matters described in the claims. In the present specification, “equal” does not only mean completely equal, but also means substantially equal, that is, including a difference of, for example, approximately several percent.

Embodiment 1

[Device Configuration]

Figure 1:
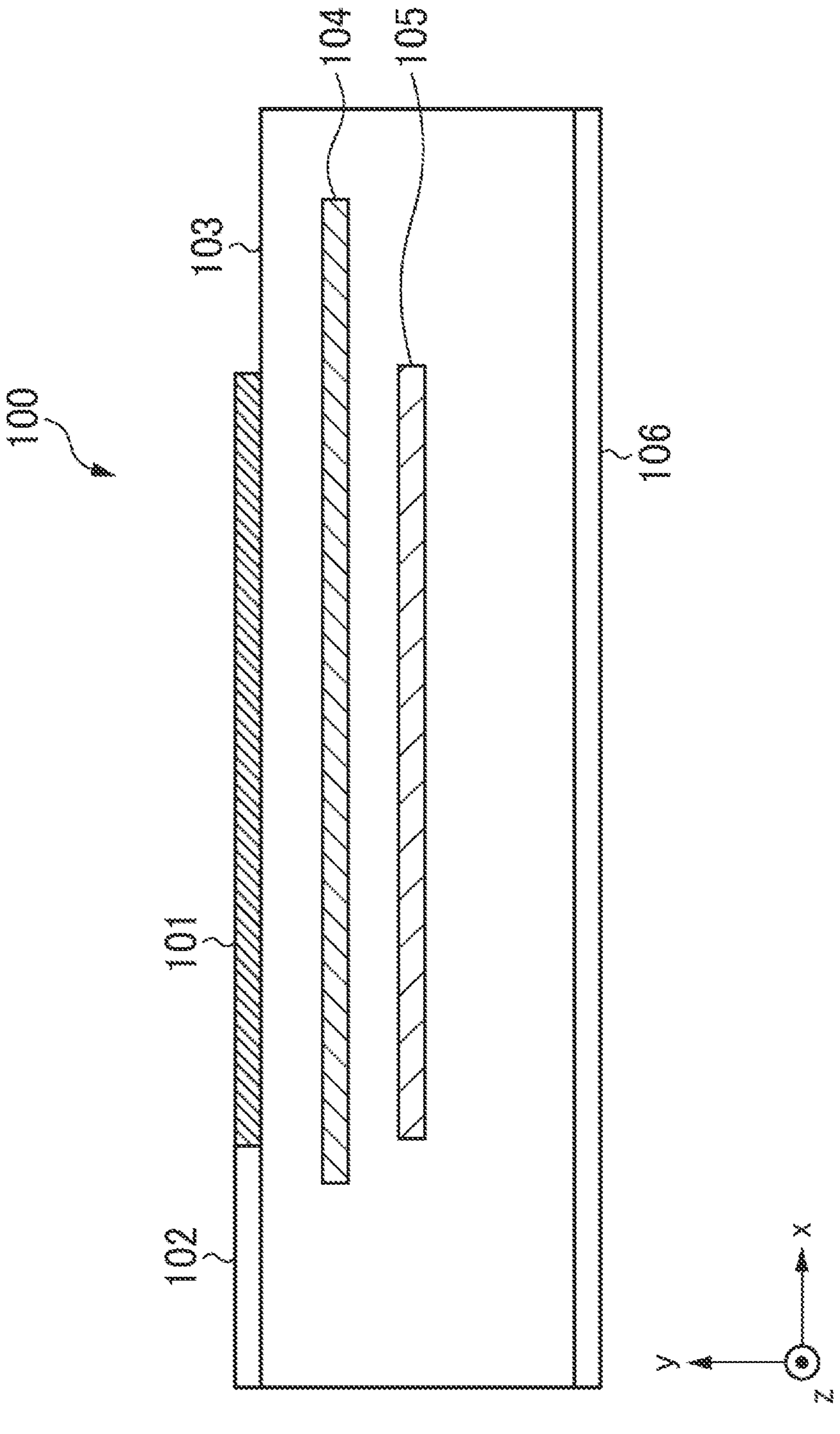
FIG. 1 is a schematic cross-sectional view showing a configuration example of an antenna device according to Embodiment 1.

FIG. 1 is a schematic cross-sectional view showing a configuration example of an antenna device 100 according to the present embodiment. In the present specification, the description will be made using a three-dimensional coordinate system including an x axis, a y axis, and a z axis, and the directions of the three-dimensional coordinate system in each figure are assumed to correspond. The configuration of each axis is an example, and the present disclosure is not limited thereto. In the present specification and the drawings, the size of each member is an example.

The antenna device 100 includes an excitation element 101, a radio frequency input element 102, a resonance element 104. The antenna device 100 may include a resonance element 105, and a reflection plate 106. Hereinafter, an example will be described in which the antenna device 100 includes the resonance element 105 and the reflection plate 106. The antenna device 100 has a rectangular outer shape, for example, and has a plurality of layers. Here, an xz plane corresponds to the surface of the substrate, and a y axis corresponds to the thickness direction of the antenna device 100. In this example, along a y axis direction, the excitation element 101 side is the front side of the antenna device 100, and the reflection plate 106 side is the back side of the antenna device 100. A metal component or the like of an enclosure (not shown) in which the antenna device 100 is provided is located on the back side of the antenna device 100. A specific example of the dimension of the antenna device 100 will be described later, and may be adjusted as appropriate depending on the target frequency band.

The excitation element 101 has a loop shape. The radio frequency input element 102 through which radio frequency is supplied to the excitation element 101. The excitation element 101 emits a polarized wave when supplied with power from the radio frequency input element 102. The polarized wave is, for example, an electromagnetic wave. The polarized wave emitted from the excitation element 101 travels not only in the front direction of the antenna device 100 but also in the back direction. In other words, the excitation element 101 functions as an antenna element. In the present specification, the antenna element may be expressed as an excitation element. The excitation element 101 and the radio frequency input element 102 may be connected via a trap circuit (not shown). The trap circuit includes a capacitor and a coil, and removes an undesired signal. Further, to the radio frequency input element 102, radio frequency is input from a radio frequency circuit.

The dielectric layer 103 includes a dielectric material. The type of dielectric material is not particularly limited, and a material having characteristics for achieving a relative permittivity to be described later is used. At least one resonance element is located inside the dielectric layer 103. In the present embodiment, an example is shown in which the dielectric layer 103 includes two resonance elements. In the present embodiment, of the two resonance elements, the resonance element 104 located on the excitation element 101 side is a resonance element corresponding to a low-range frequency, and the resonance element 105 located on the reflection plate 106 side is a resonance element corresponding to a high-range frequency. Here, the high-range frequency and the low-range frequency indicate a relative relationship and are not particularly limited. In the present embodiment, both the resonance element 104 and the resonance element 105 have a loop shape. The excitation element 101, the resonance element 104, and the resonance element 105 are arranged with an interval that allows electromagnetic coupling. When electromagnetically coupled to the excitation element 101, the resonance element 104 and the resonance element 105 resonate at a predetermined frequency. In other words, when the polarized wave emitted by the excitation element 101 is incident on the resonance element 104 and the resonance element 105, the resonance element 104 and the resonance element 105 emit a polarized wave of a predetermined frequency. The shortest distance between the excitation element 101, and the resonance element 104 and the resonance element 105 is, for example, 2 mm or less. The resonance element 104 is an example of a first resonance element. The resonance element 105 is an example of a second resonance element. Since the excitation element 101 and the resonance element 104 have a loop shape, the polarized wave emitted by the resonance element 105 can be emitted in the front direction through the space inside the inner diameter of the excitation element 101 and the resonance element 104. Accordingly, the gain of the antenna device 100 can be improved in the case in which the excitation element 101 and the resonance element 104 have a loop shape, as compared with the case in which the excitation element 101 and the resonance element 104 have, for example, a plate shape.

The reflection plate 106 faces the excitation element 101. The positional relationship when the reflection plate 106 and the excitation element 101 face each other may be adjusted depending on the directivity achieved by the antenna device 100 and the like. For example, the reflection plate 106 and the excitation element 101 may be provided in parallel. The reflection plate 106 is, for example, a metal plate. The reflection plate 106 is, for example, a copper plate. The reflection plate 106 reflects the polarized wave emitted from the excitation element 101 to direct the polarized wave toward the front direction of the antenna device 100. As described above, the antenna device 100 is affected by the presence of a metal component around the antenna device 100, and there is concern that the performance (for example, the gain, the radiation directivity, or the frequency bandwidth) of the antenna device may deteriorate. By providing the reflection plate 106 on the back surface of the antenna device 100, that is, on the side where the metal component may be present, the influence of the metal can be reduced to a certain extent.

In the present embodiment, in consideration of the influence as described above, a configuration example will be described that can achieve both improved performance and size reduction of the antenna device.

Figure 2:
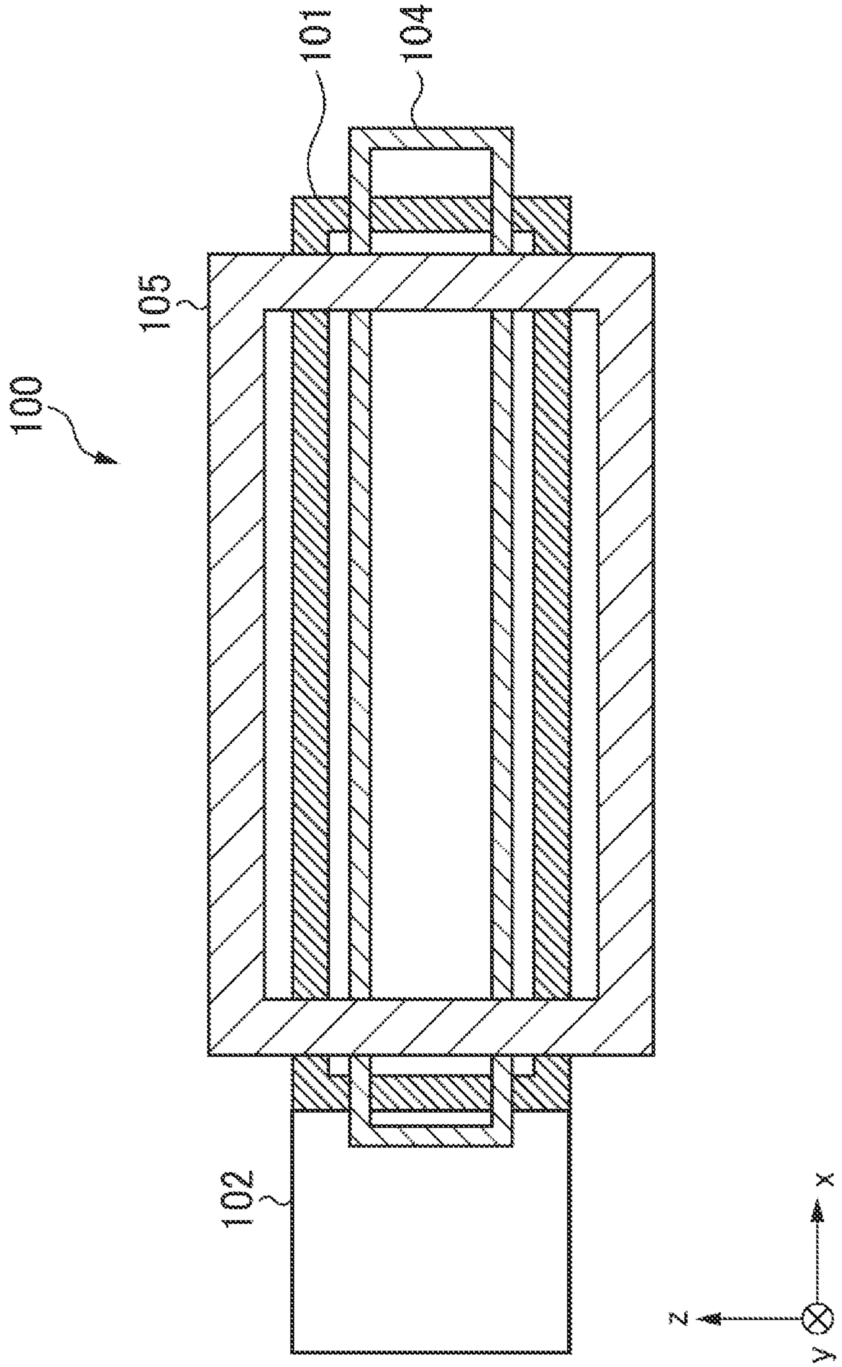
FIG. 2 is a schematic top view showing the configuration example of the antenna device according to Embodiment 1.

FIG. 2 is a schematic top view of the antenna device 100 shown in FIG. 1 as viewed from the back side. The high-range frequency resonance element 105, the low-range frequency resonance element 104, and the excitation element 101 are provided in this order from the back side. The excitation element 101 and the resonance element 104 are provided at a distance that allows electromagnetic coupling. The excitation element 101 and the resonance element 105 are provided at a distance that allows electromagnetic coupling.

[Frequency Characteristics]

Figure 3:
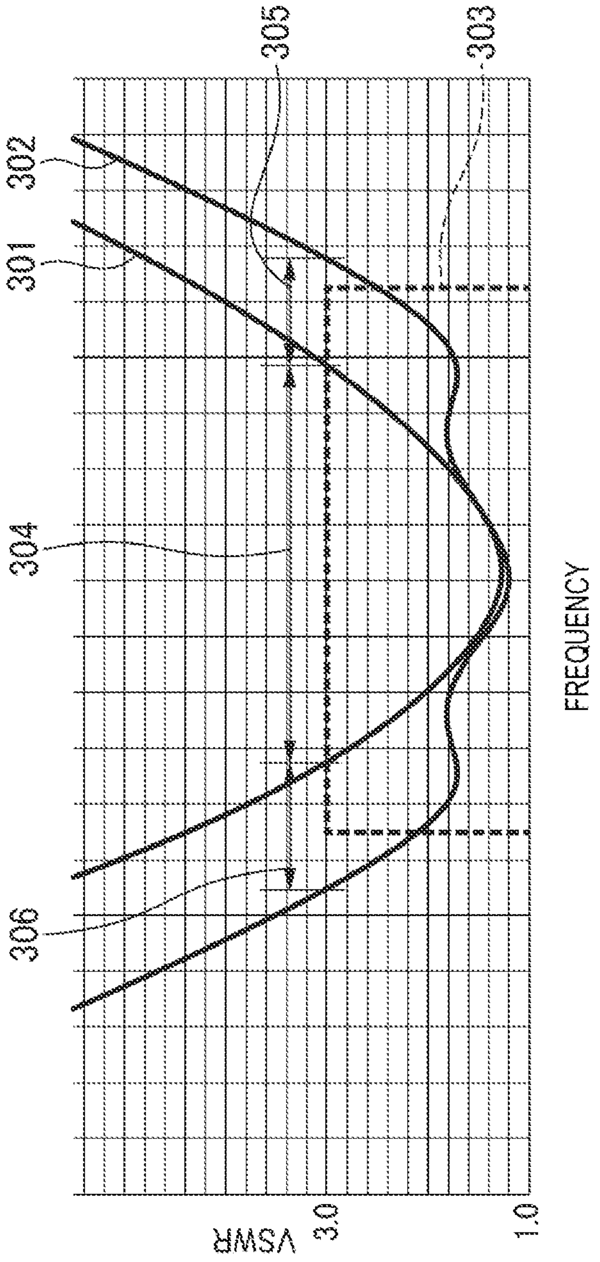
FIG. 3 is a diagram showing frequency characteristics of the antenna device according to Embodiment 1.

FIG. 3 is a diagram showing frequency characteristics of the antenna device 100 according to the present embodiment. In FIG. 3, the horizontal axis indicates a frequency, and the vertical axis indicates a voltage standing wave ratio (VSWR). A broken line 303 indicates an example of a frequency band and a VSWR that are required for the antenna device 100. The VSWR is shown as an index of the gain of the antenna device. When the VSWR is 3.0, the gain of the antenna device is, for example, approximately 70% to 80%. The required performance of the antenna device according to the present embodiment is a gain of 70% or more. As the VSWR becomes closer to 1, the gain of the antenna device becomes higher. On the other hand, a graph 301 indicates the frequency band and the VSWR value of the antenna device achieved based on the signal emitted by the excitation element 101 alone. A frequency bandwidth 304 is a frequency bandwidth in which the VSWR value satisfies 3 in the antenna device. When the broken line 303 and the frequency bandwidth 304 are compared, it can be seen that the bandwidth of the antenna device achieved based on the signal emitted by the excitation element 101 alone is insufficient on both the high-range frequency side and the low-range frequency side.

On the other hand, the graph 302 indicates the frequency band and the VSWR value that are achieved in the antenna device 100 when the resonance element 104 and the resonance element 105 are provided in addition to the excitation element 101. A frequency bandwidth 305 indicates the range of the frequency band extended by the resonance element 105. A frequency bandwidth 306 indicates the range of the frequency band extended by the resonance element 104. By providing the resonance element 104 and the resonance element 105 in addition to the excitation element 101, it is possible to extend the frequency bandwidth in the antenna device 100. As the number of resonance elements resonating in different frequency bands increases, the frequency bandwidth of the antenna device can be further extended.

In this example, in the configuration of the antenna device 100 corresponding to each of the graphs 301 and 302, configurations other than the resonance element 104 and the resonance element 105 are not changed. Therefore, it is possible to improve the performance of the antenna device while maintaining the dimensions (in particular, the size in an xy plane).

In the present specification, the excitation element and the resonance element are not limited to a rectangular loop shape as shown in FIG. 2. For example, in addition to the rectangular shape, a circular shape or a spiral shape may be used. Alternatively, the configuration may also be read as a ring type. The resonance element is not limited to the loop shape, and may be formed in a plate shape, for example. The plurality of resonance elements may have different shapes.

Although the plurality of resonance elements are provided parallel to the xz plane, the present disclosure is not limited thereto. In consideration of the directivity of the antenna device, for example, the antenna device may be provided in a relationship other than parallel to the xz plane.

(Modification 1)

Figure 4:
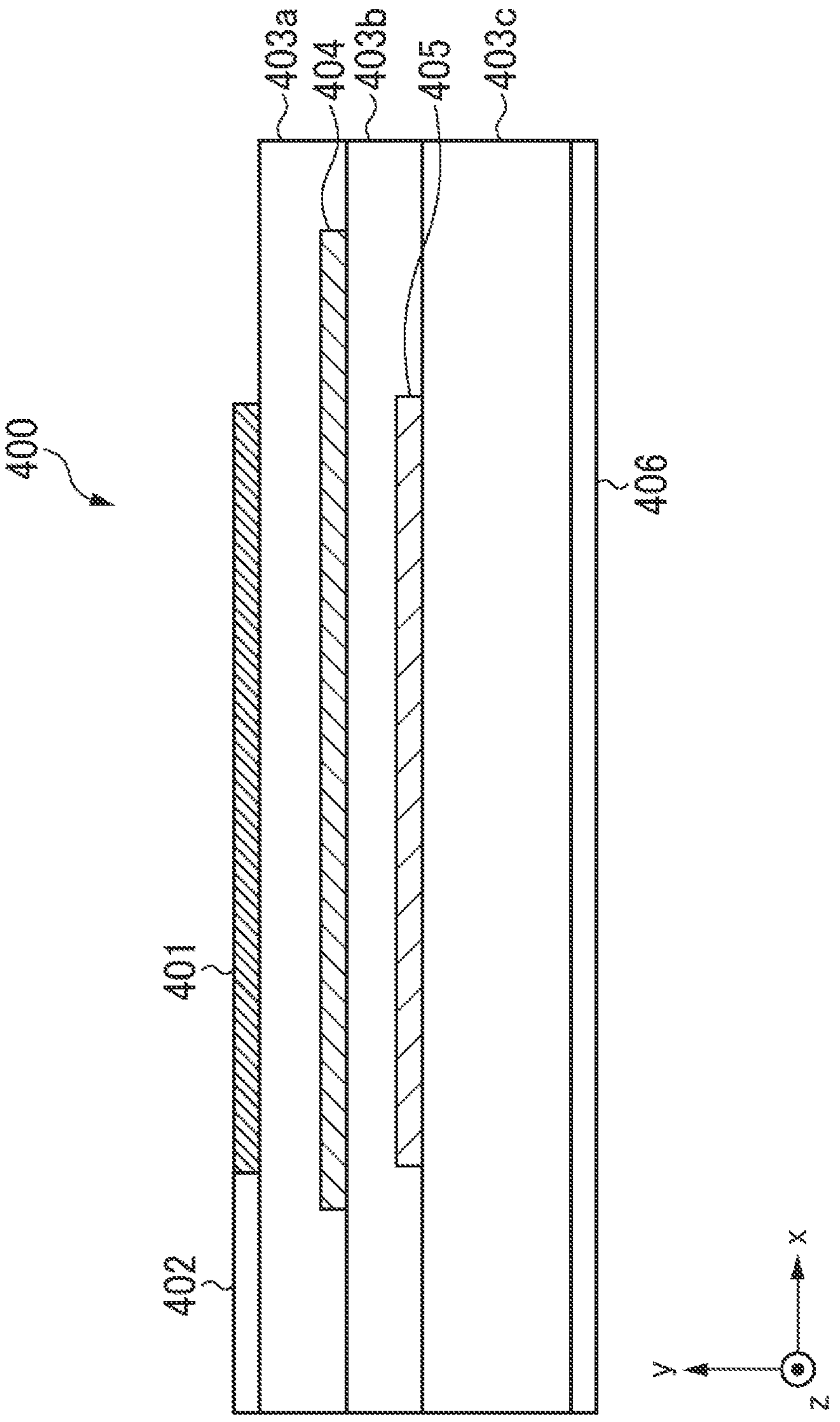
FIG. 4 is a schematic cross-sectional view showing Modification 1 of the antenna device according to Embodiment 1.

FIG. 4 shows a modification of the antenna device according to the present embodiment. In the configurations of an antenna device 400, the configuration of the dielectric layer is different from that in FIG. 1. In the present modification, the dielectric layer includes three layers which are a dielectric layer 403*a*, a dielectric layer 403*b*, and a dielectric layer 403*c*. A low-range frequency side resonance element 404 is provided in the dielectric layer 403*a*. A high-range frequency side resonance element 405 is provided in the dielectric layer 403*b*. Further, the three dielectric layers 403*a* to 403*c* have different relative permittivities. The dielectric layer 403*a* is an example of a first dielectric layer. The dielectric layer 403*b* is an example of a second dielectric layer. Among the plurality of dielectric layers, the closer the dielectric layer is to the reflection plate 406, the more likely the dielectric layer is to be affected by the metal component located on the back side of the reflection plate 406, and the narrower the frequency bandwidth of polarized wave becomes. In FIG. 4, the dielectric layer 403*c*, the dielectric layer 403*b*, and the dielectric layer 403*a* are likely to be affected by the metal component located on the back side in this order. On the other hand, considering that increasing the relative permittivity of the dielectric layer makes it less susceptible to the influence of the metal component, it is preferable that the dielectric layer closer to the reflection plate 406 has a higher relative permittivity. Accordingly, the antenna device 400 can secure a desired frequency bandwidth. For example, when the relative permittivities of the dielectric layer 403*a*, the dielectric layer 403*b*, and the dielectric layer 403*c* are a relative permittivity A, a relative permittivity B, and a relative permittivity C, respectively, the relative permittivities may be designed such that $A<B<C$, and more specifically, the relative permittivities may be designed such that $A=3.4$, $B=4.4$, and $C=5.4$.

The VSWR may be adjusted by changing the material forming the dielectric layer 403*a*, the dielectric layer 403*b*, and the dielectric layer 403*c*, or by changing the thicknesses of the dielectric layer 403*a*, the dielectric layer 403*b*, and the dielectric layer 403*c* and adjusting the electrostatic capacitance. The dielectric layer 403*a*, the dielectric layer 403*b*, and the dielectric layer 403*c* are sandwiched between the excitation element 401 and the resonance element 404, between the resonance element 404 and the resonance element 405, and between the resonance element 405 and the reflection plate 406, respectively. At this time, the dielectric layer and the excitation element, the resonance element, or the reflection plate sandwiching the dielectric layer can be regarded as one capacitor. The electrostatic capacitance of each capacitor formed in the antenna device 400 can be adjusted by changing the thickness of the dielectric layer. By appropriately adjusting the electrostatic capacitance, the VSWR of the antenna device 400 can be made close to a desired value.

According to the above configuration, it is possible to improve the performance for a desired frequency band without increasing the size of the antenna device 100.

(Modification 2)

Figure 5B:
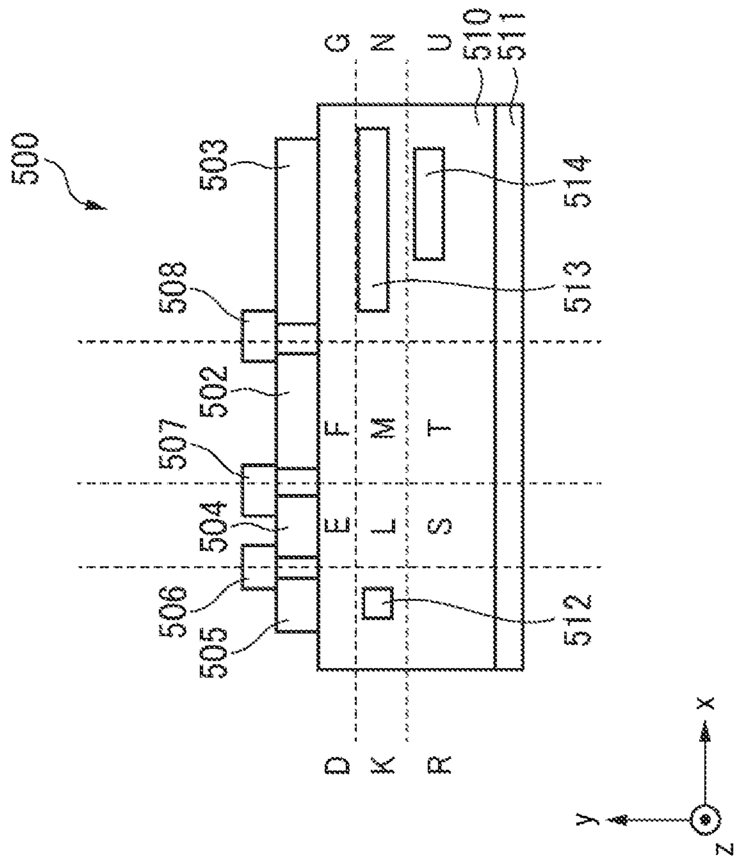
FIGS. 5A and 5B are schematic diagrams showing Modification 2 of the antenna device according to Embodiment 1.
Figure 5A:
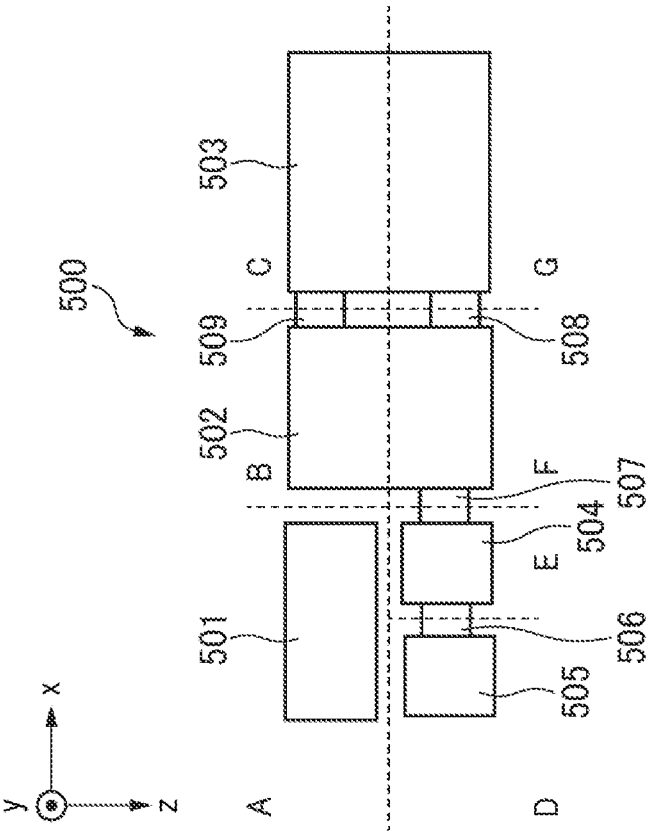

The dielectric layer may be divided into smaller regions than that in Modification 1 of the present embodiment, and the relative permittivity may be changed in each region. FIGS. 5A and 5B show another modification of the antenna device according to the present embodiment. In the antenna device 500, for example, a resonance element 501, an excitation element 502, an excitation element 503, an excitation element 504, an excitation element 505, a trap circuit 506, a trap circuit 507, a trap circuit 508, and a trap circuit 509 are provided. The antenna device 500 is provided with a dielectric layer 510 and a reflection plate 511. A resonance element is provided within the dielectric layer 510, and in the example in FIGS. 5A and 5B, three resonance elements 512, 513, and 514 are provided. Here, an example is shown in which the dielectric layer 510 is divided into several regions and the relative permittivity is changed for each region. Depending on the positions of the resonance element 501 and the excitation element 502 to the excitation element 505 that are provided in the antenna device 500, the dielectric layer 510 is divided into seven regions by notches parallel to the y axis, as shown by a broken line in FIG. 5A.

Further, as shown by a broken line in FIG. 5B, the dielectric layer 510 is divided into three regions by notches parallel to the x axis. As a result, the dielectric layer 510 can be divided into a total of 21 regions which are regions A to U. Here, the notch may be defined according to the position of the resonance element provided in the dielectric layer 510. Therefore, in the example in FIG. 5B, the notch for division is defined corresponding to the positions of the resonance element 512, the resonance element 513, and the resonance element 514.

As described in Modification 1 of the present embodiment, the VSWR can be made close to a desired value by adjusting the relative permittivity of the dielectric layer 510 provided in each of the regions. At this time, it is preferable that, among the regions A to U, the region closer to the reflection plate 511 has a higher relative permittivity. In Modification 2 of the present embodiment, the dielectric layer is divided into smaller parts than that in Modification 1 of the present embodiment, and the relative permittivity of each region can be adjusted. Therefore, it is easier to bring the VSWR closer to a desired value.

The VSWR may be adjusted by changing the material forming the dielectric layer 510, or by changing the thickness of the dielectric layer 510, that is, the way the regions are divided. The number of regions to be divided is an example. Alternatively, for example, other dividing methods and numbers of regions may be used depending on the number, arrangement, size, or the like of resonance elements within the dielectric layer 510.

Figure 6:
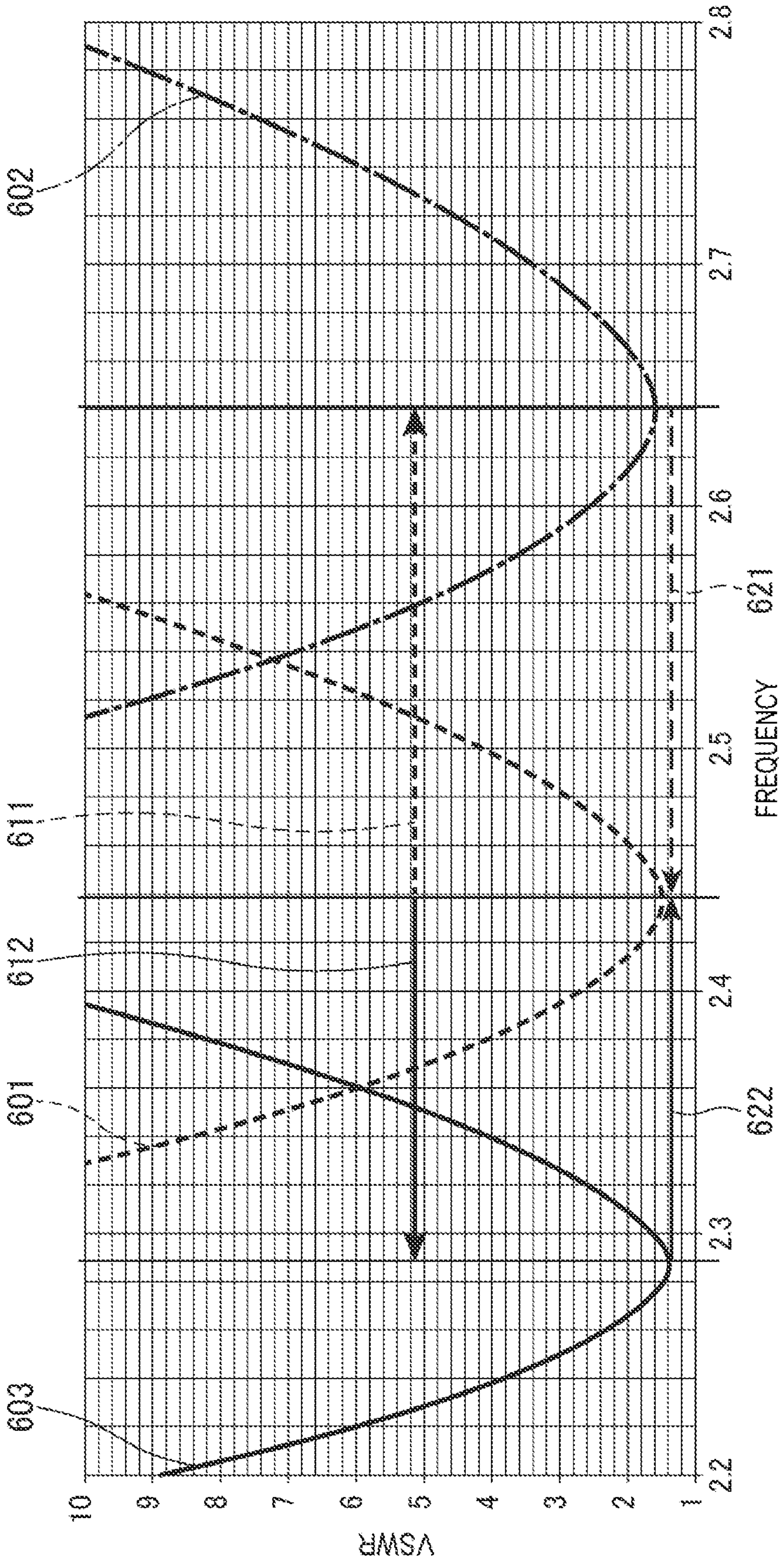
FIG. 6 is a diagram showing Modification 2 of the antenna device according to Embodiment 1.

FIG. 6 is a diagram showing a variation in frequency characteristics when the relative permittivity of the dielectric layer of the antenna device not including the resonance element 512, the resonance element 513, and the resonance element 514 is uniformly changed in the regions A to U in the antenna device 500 shown in FIGS. 5A and 5B. However, even when the relative permittivity of the dielectric layer of the antenna device 500 shown in FIGS. 5A and 5B is uniformly changed in the regions A to U, it is assumed that the variation in frequency characteristics as shown in FIG. 6 is observed. In FIG. 6, the horizontal axis indicates the frequency, and the vertical axis indicates the VSWR. A broken line 601 shows frequency characteristics when the relative permittivity of the dielectric layer is 4.4. A dashed-dotted line 602 shows frequency characteristics when the relative permittivity of the dielectric layer is 3.4. A solid line 603 shows frequency characteristics when the relative permittivity of the dielectric layer is 5.4.

When the relative permittivity is lowered as shown by an arrow 611 (adjusting the relative permittivity from 4.4 to 3.4) or an arrow 622 (adjusting the relative permittivity from 5.4 to 4.4), the corresponding frequency band increases. Conversely, when the relative permittivity is increased as shown by an arrow 612 (adjusting the relative permittivity from 4.4 to 5.4) or an arrow 621 (adjusting the relative permittivity from 3.4 to 4.4), the corresponding frequency band is lowered. The example in FIG. 6 shows an example in which the 21 regions shown in FIGS. 5A and 5B are uniformly changed. By using such characteristics, the target frequency characteristics can be achieved by adjusting the relative permittivity for each region.

(Modification 3)

Figure 7:
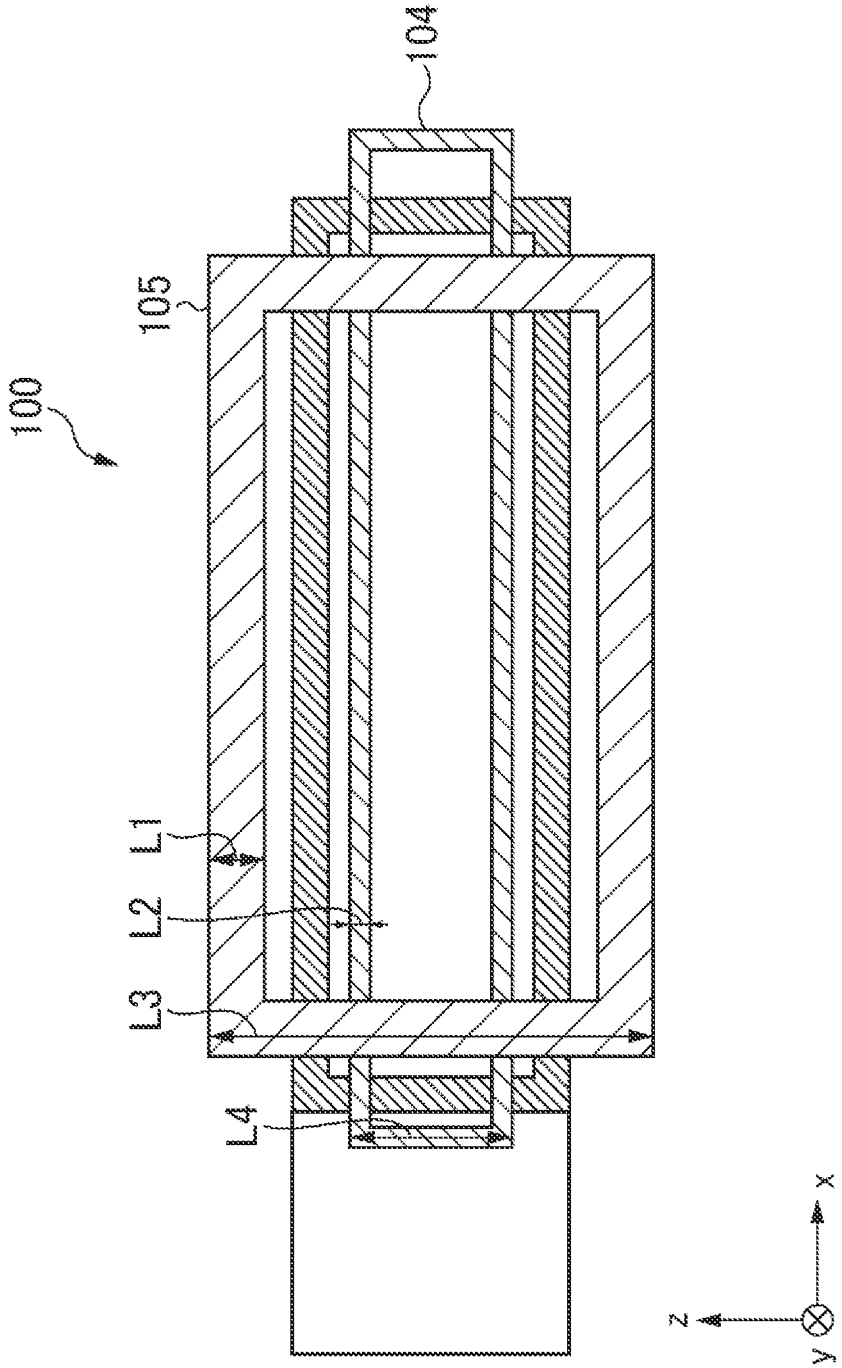
FIG. 7 is a schematic top view showing Modification 3 of the antenna device according to Embodiment 1.

FIG. 7 is a schematic top view of Modification 3 of the antenna device according to the present embodiment as viewed from the back side. The schematic top view of the antenna device 100 shown in FIG. 7 is the same as the configuration shown in FIG. 1. That is, as shown in FIG. 1, the reflection plate 106 (not shown) is provided on the back side of the antenna device 100 in the antenna device 100 in FIG. 7. In FIG. 7, L1 indicates the shortest distance from the inner diameter of the resonance element 105 toward the outer diameter of the resonance element 105. L2 indicates the shortest distance from the inner diameter of the resonance element 104 toward the outer diameter of the resonance element 104. L3 indicates the length of the short side of the resonance element 105. L4 indicates the length of the short side of the resonance element 104. The short side of the resonance element 104 is an example of a first short side. The short side of the resonance element 105 is an example of a second short side.

The closer the resonance element is to the reflection plate 106, the more the impedance of the resonance element decreases due to the influence of the metal component located further back than the reflection plate 106. As the impedance decreases, the gain and the frequency bandwidth of the resonance element decrease. When the shortest distance from the inner diameter of the resonance element toward the outer diameter of the resonance element is increased, the impedance of the resonance element can be increased. Accordingly, it is possible to extend the gain and the frequency bandwidth of the resonance element. Therefore, the closer the resonance element is to the reflection plate 106, the larger the shortest distance from the inner diameter to the outer diameter may be. For example, in the configuration shown in FIG. 7, L1 becomes larger than L2, so that it is possible to improve the gain of the antenna device 100 and to extend the frequency bandwidth.

The impedance of the resonance element can be increased by increasing the length of the short side of the resonance element. Therefore, the closer the resonance element is to the reflection plate 106, the larger the length of the short side may be. For example, in the configuration shown in FIG. 7, L4 becomes larger than L3, so that it is possible to improve the gain of the antenna device 100 and to extend the frequency bandwidth. By increasing the length of the short side of the resonance element, the frequency band of the resonance element shifts to the low-range frequency side. However, by reducing the length of the long side of the resonance element and shifting the frequency band to the high-range frequency side, it is possible to adjust the frequency band shifted to the low-range frequency side to the frequency band before shifting to the low-range frequency side. Even when the resonance element 104 and the resonance element 105 have a plate shape, the length of the short side of the resonance element 105 is larger than the length of the short side of the resonance element 104, so that it is possible to improve the gain of the antenna device 100 and to extend the frequency band.

Therefore, by adjusting the shape of the resonance element under the above-described conditions, it is possible to further improve the performance without increasing the size of the antenna device 100.

As described above, according to the present embodiment, the antenna device (for example, the antenna device 100) includes the dielectric layer (for example, the dielectric layer 510) including the dielectric, the antenna element (for example, the excitation element 101) that is located on the surface of the dielectric layer and that has a loop shape, the radio frequency input element through which radio frequency is supplied to the antenna element, and at least one resonance element (for example, the resonance element 104 and the resonance element 105) that is located inside the dielectric layer. Accordingly, it is possible to provide an antenna configuration capable of achieving both the size reduction and performance improvement of the antenna device.

In the antenna device (for example, the antenna device 100), the at least one resonance element includes the first resonance element (for example, the resonance element 104) having a loop shape. The reflection plate (for example, the reflection plate 106) and the antenna element are configured to sandwich the dielectric layer, the at least one resonance element includes the second resonance element (for example, the resonance element 105) that is located between the first resonance element and the reflection plate and that has a loop shape, and the shortest distance (for example, L1) from the inner diameter of the second resonance element to the outer diameter of the second resonance element is longer than the shortest distance (for example, L2) from the inner diameter of the first resonance element to the outer diameter of the first resonance element. Accordingly, it is possible to provide an antenna configuration capable of achieving both the size reduction and performance improvement of the antenna device. In particular, the desired frequency characteristics can be achieved without increasing the size of the antenna device.

The antenna device (for example, the antenna device 100) includes the reflection plate (for example, the reflection plate 106). The reflection plate and the antenna element are configured to sandwich the dielectric layer, the at least one resonance element includes the first resonance element (for example, the resonance element 104) and the second resonance element (for example, the resonance element 105) located between the first resonance element and the reflection plate, the first resonance element has a rectangular shape having the first short side (for example, L4), the second resonance element has a rectangular shape having the second short side (for example, L3), and the second short side is longer than the first short side. Accordingly, it is possible to provide an antenna configuration capable of achieving both the size reduction and performance improvement of the antenna device. In particular, the desired frequency characteristics can be achieved without increasing the size of the antenna device.

In the antenna device (for example, the antenna device 100), the antenna element and at least one resonance element are provided at an interval that allows electromagnetic coupling, and the at least one resonance element resonates at a predetermined frequency when electromagnetically coupled to the antenna element. The reflection plate (for example, the reflection plate 106) and the antenna element are configured to sandwich the dielectric layer, the at least one resonance element includes the first resonance element (for example, the resonance element 104) and the second resonance element (for example, the resonance element 105) located between the first resonance element and the reflection plate, and the frequency at which the second resonance element resonates is higher than the frequency at which the first resonance element resonates. Accordingly, it is possible to provide an antenna configuration capable of achieving both the size reduction and performance improvement of the antenna device. In particular, the desired frequency characteristics can be achieved without increasing the size of the antenna device.

The antenna device (for example, the antenna device 400) includes the reflection plate (for example, the reflection plate 406). The reflection plate and the antenna element are configured to sandwich the dielectric layer, the dielectric layer includes a first dielectric layer (for example, a dielectric layer 404*a*) and a second dielectric layer (for example, a dielectric layer 404*b* and a dielectric layer 404*c*) located between the first dielectric layer and the reflection plate, and the relative permittivity of the second dielectric layer is higher than the relative permittivity of the first dielectric layer. The dielectric layer includes a plurality of regions (for example, the regions A to U) having different relative permittivities. Accordingly, it is possible to provide an antenna configuration capable of achieving both the size reduction and performance improvement of the antenna device. In particular, the desired frequency characteristics can be achieved without increasing the size of the antenna device.

Embodiment 2

Embodiment 2 of the present invention will be described with reference to the drawings. The description of portions overlapping those in Embodiment 1 will be omitted, and the description will focus on the differences.

Figure 8:
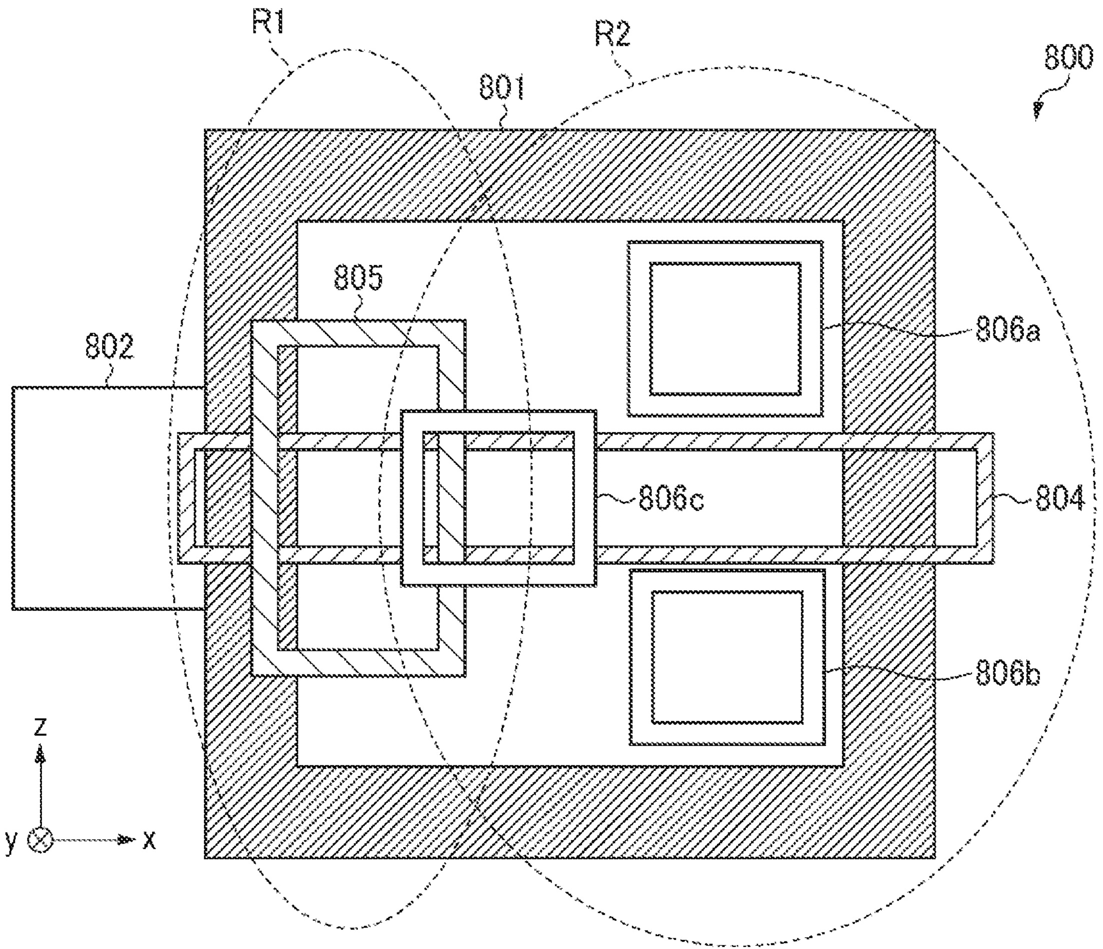
FIG. 8 is a schematic top view showing a configuration example of an antenna device according to Embodiment 2.
Figure 9:
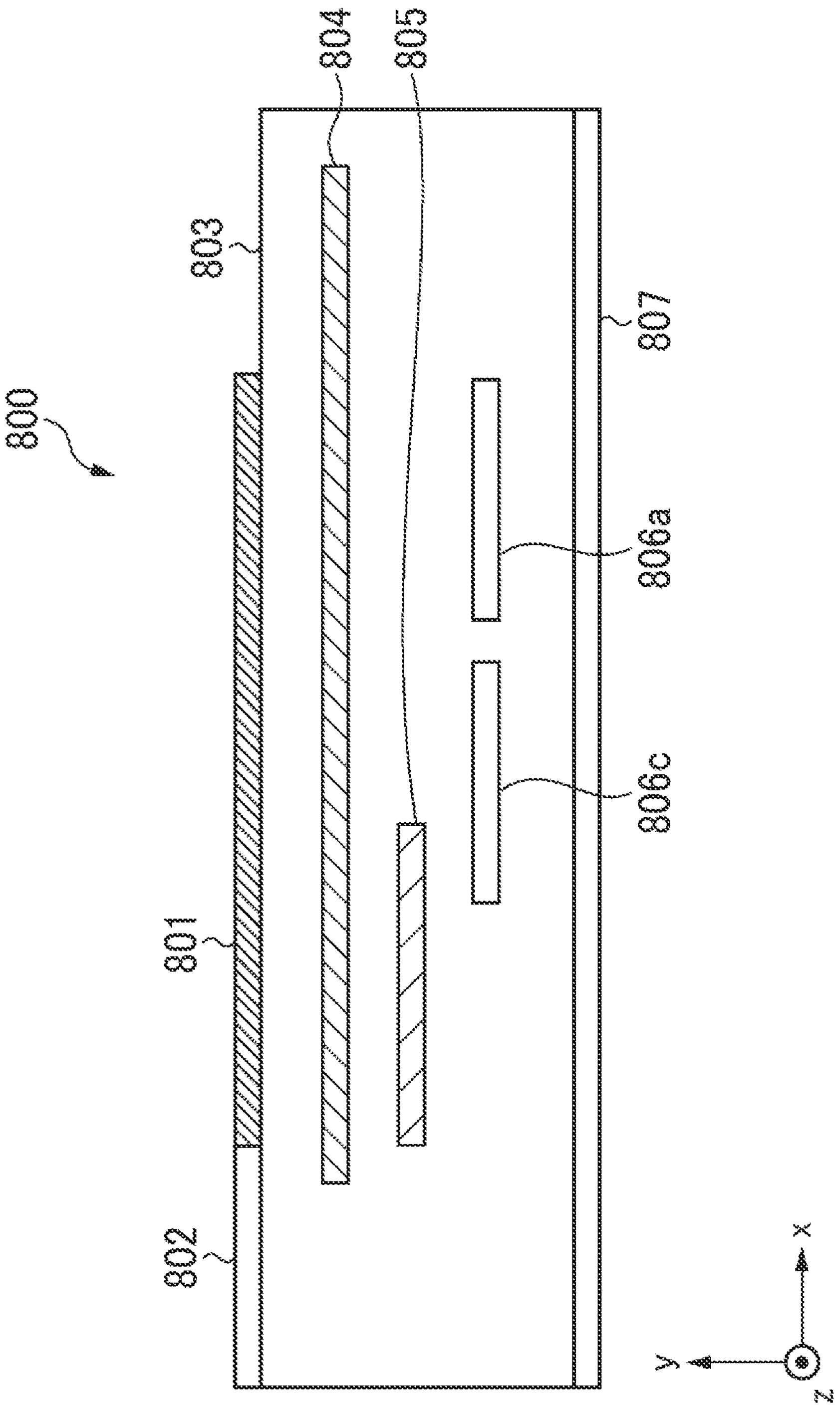
FIG. 9 is a schematic cross-sectional view showing the configuration example of the antenna device according to Embodiment 2.

FIG. 8 is a schematic top view of an antenna device 800 according to the present embodiment as viewed from the back side. FIG. 9 is a schematic cross-sectional view showing a configuration example of the antenna device 800 according to the present embodiment. A resonance element 806*a*, a resonance element 806*b*, and a resonance element 806*c* for the first band, a resonance element 805 for the second band, a resonance element 804 for the third band, and an excitation element 801 are arranged in this order from the back side. In the present embodiment, the first band is higher in frequency than the second band. The second band is higher in frequency than the third band. Therefore, the height relationship of the bands is the first band>the second band>the third band. The first band is, for example, a 7 GHz band. The second band is, for example, a 5 GHz band. The third band is, for example, a 2 GHz band. The height and the specific bandwidth of each band are merely examples, and the present invention is not limited thereto. A radio frequency input element 802 is provided in the same layer as the excitation element 801. Here, as shown in FIG. 9, the excitation element 801, and the resonance element 806*a*, the resonance element 806*b*, and the resonance element 806*c* for the first band are provided at a distance that allows electromagnetic coupling.

By adjusting the arrangement of the resonance elements, the directivity and the radiation gain of the antenna device 800 can be adjusted. In the examples in FIGS. 8 and 9, as indicated in a range R1, the gain for the second band can be improved on the left side of the antenna device 800. On the other hand, as indicated in a range R2, the gain for the first band can be improved on the right side of the antenna device 800. The size and the arrangement of the excitation element and the resonance element in FIGS. 8 and 9 are merely examples. For example, a plurality of resonance elements may be provided at the same size as the antenna device 100 shown in FIGS. 1 and 2 and at the same distance from the reflection plate.

(Modification 1)

Figure 10:
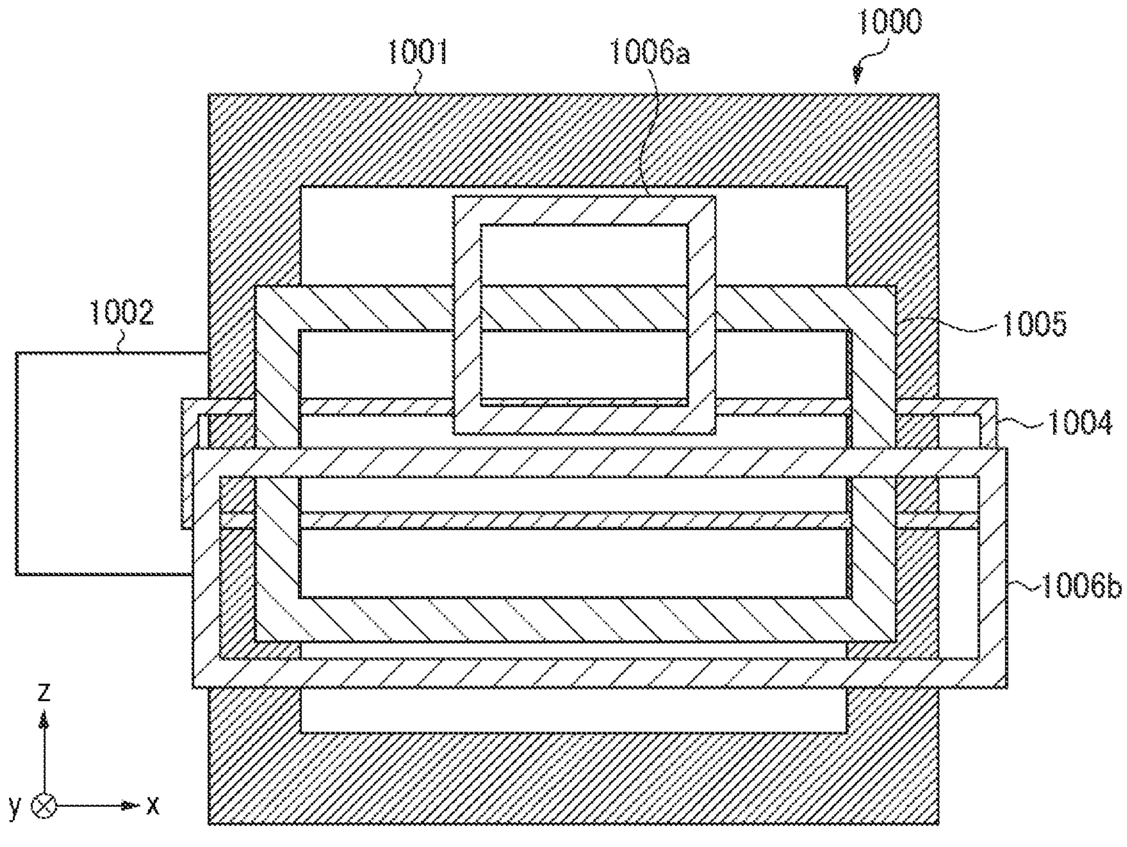
FIG. 10 is a schematic top view showing Modification 1 of the antenna device according to Embodiment 2.
Figure 11:
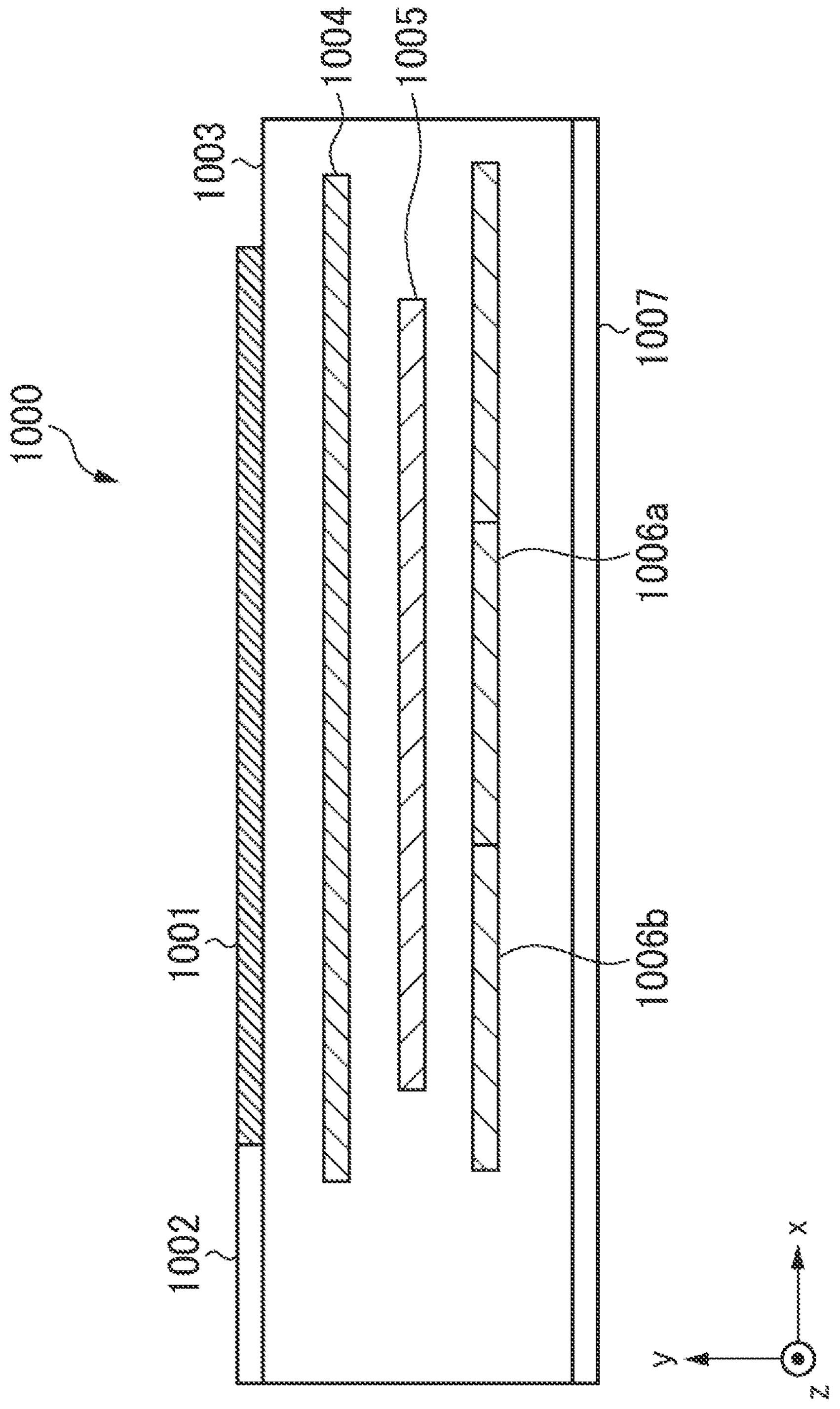
FIG. 11 is a schematic cross-sectional view showing the configuration example of the antenna device according to Embodiment 2.

FIG. 10 is a schematic top view of an antenna device 1000 according to Modification 1 of the present embodiment as viewed from the back side. FIG. 11 is a schematic cross-sectional view showing a configuration example of the antenna device 1000 according to Modification 1 of the present embodiment. A resonance element 1006*a* and a resonance element 1006*b* for the first band, a resonance element 1005 for the second band, a resonance element 1004 for the third band, and an excitation element 1001 are arranged in this order from the back side. In Modification 1 of the present embodiment, the first band is higher in frequency than the second band. The second band is higher in frequency than the third band. Therefore, the height relationship of the bands is the first band>the second band>the third band. The first band is, for example, a 7 GHz band. The second band is, for example, a 5 GHz band. The third band is, for example, a 2 GHz band. The height and the specific bandwidth of each band are merely examples, and the present invention is not limited thereto. A radio frequency input element 1002 is provided in the same layer as the excitation element 1001. Here, as shown in FIG. 11, the resonance element 1006*a* and the resonance element 1006*b* for the first band are provided at positions having the same distance from a reflection plate 1007. The resonance element 1006*a* is an example of a first resonance element. The resonance element 1006*b* is an example of a third resonance element.

The excitation element 1001 and the resonance element 1004 are provided at a distance that allows electromagnetic coupling. Similarly, the excitation element 1001 and the resonance element 1005 are provided at a distance that allows electromagnetic coupling. Similarly, the excitation element 1001, and the resonance element 1006*a* and the resonance element 1006*b* are provided at a distance that allows electromagnetic coupling.

As described above, in the present embodiment, a plurality of resonance elements (for example, the resonance element 806*a*, the resonance element 806*b*, and the resonance element 1006*c*) are provided inside the dielectric layer at positions having the same shortest distance from the reflection plate. The reflection plate (for example, reflection plate 1007) and the antenna element are configured to sandwich the dielectric layer (for example, the dielectric layer 1003) is provided, the at least one resonance element includes the first resonance element (for example, the resonance element 1006*a*) and the third resonance element (for example, the resonance element 1006*b*), and the shortest distance between the first resonance element and the reflection plate is equal to the shortest distance between the third resonance element and the reflection plate. Accordingly, it is possible to provide an antenna configuration capable of achieving both the size reduction and performance improvement of the antenna device. In particular, the desired frequency characteristics can be achieved without increasing the size of the antenna device.

Embodiment 3

A specific configuration example of an antenna device according to the present invention will be described as Embodiment 3. In the present embodiment, an example of an antenna device that is capable of wireless communication in compliance with wireless local area network (LAN) standards such as Wi-Fi (registered trademark) will be described with frequencies in the 2.4 GHz band and the 5 GHz band as operating frequencies. Therefore, the antenna device includes a layer structure corresponding to the 2.4 GHz band and a layer structure corresponding to the 5 GHz band. The present invention is not limited to the above standards, and may be applied to wireless communication in a frequency band in compliance with another standard. For example, the present invention may be applied to wireless communication in the 7 GHz band.

FIGS. 12A to 15 are schematic diagrams showing a configuration example of an antenna device 1200 according to the present embodiment. Numerical values of dimensions shown in FIGS. 12A to 15 are shown in units of "millimeters (mm)". The antenna device 1200 according to the present embodiment has a four-layer structure. The uppermost layer on the front side is a first layer, and the lowermost layer on the back side is a fourth layer.

Figure 12A:
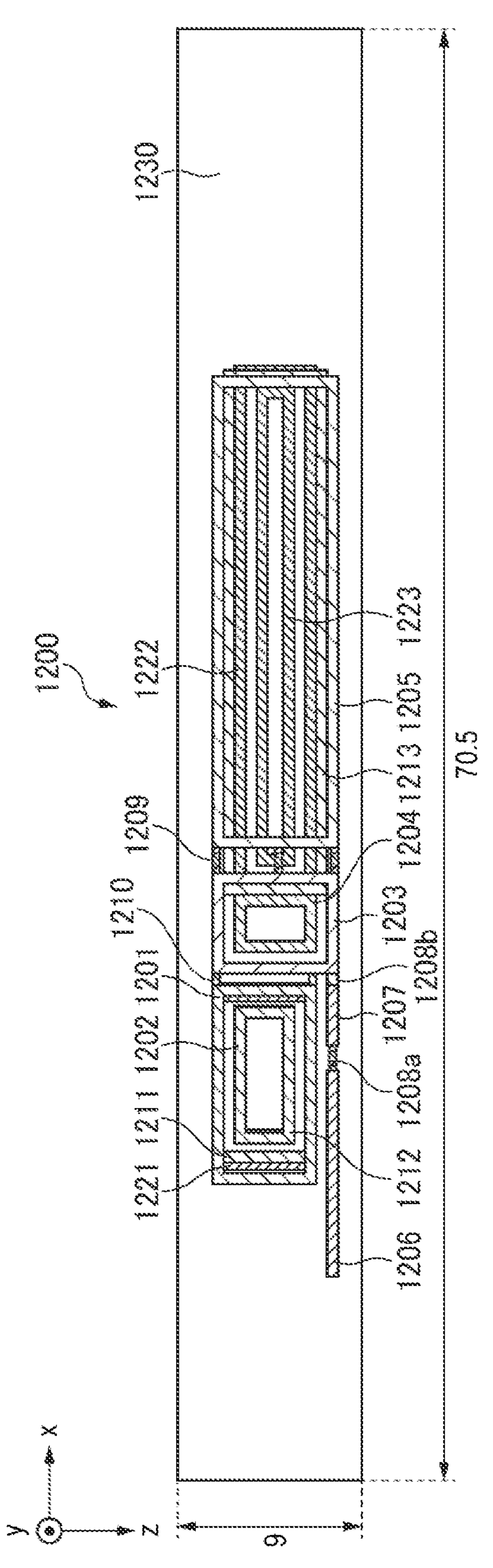
FIGS. 12A and 12B are schematic diagrams showing a specific example of an antenna device according to Embodiment 3.
Figure 12B:
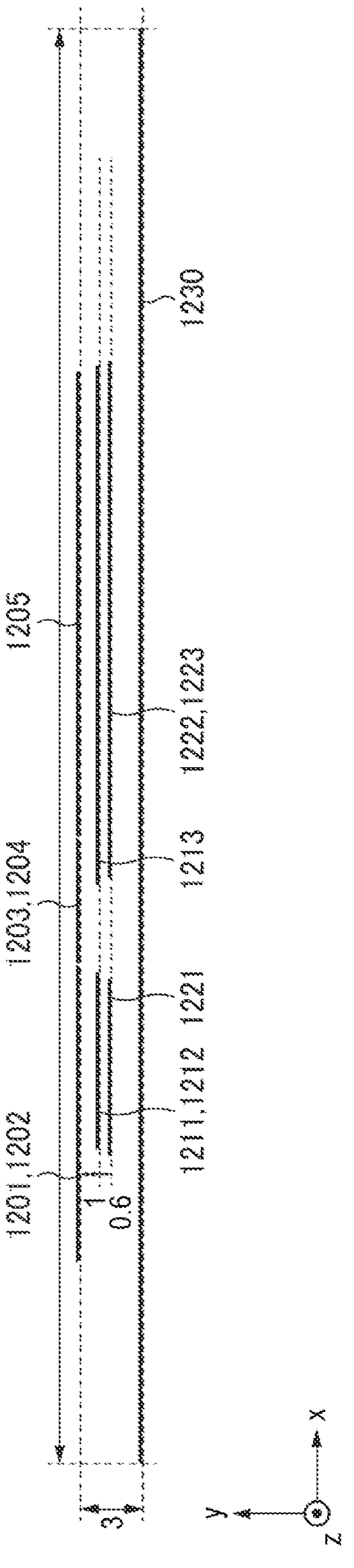

FIG. 12A is a schematic top view of the antenna device 1200, and is a view of the antenna device 1200 viewed from the front side along the y axis direction. FIG. 12B is a schematic cross-sectional view of the antenna device 1200 viewed along a z axis direction. The thickness of the antenna device 1200 is, for example, 3 mm.

Figure 13:
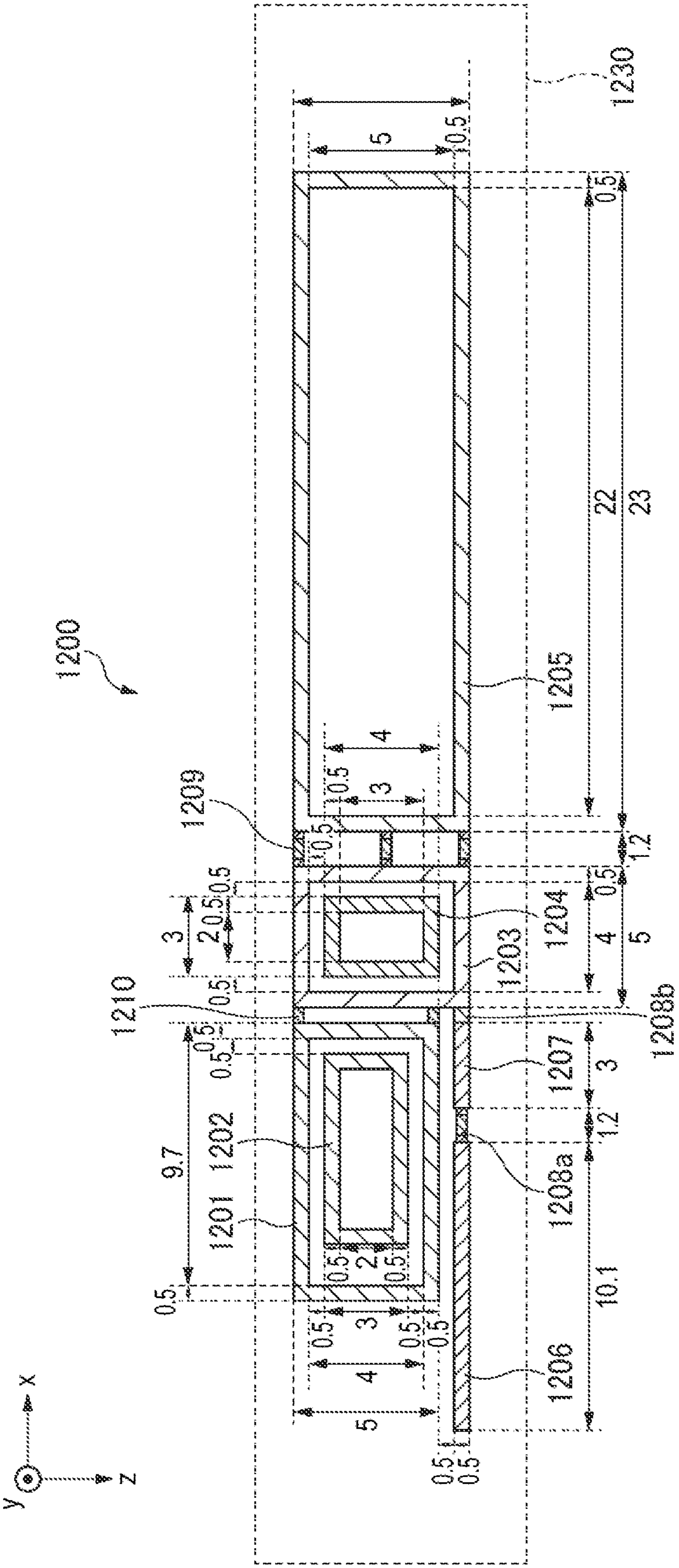
FIG. 13 is a schematic diagram showing a specific example of the antenna device according to Embodiment 3.

FIG. 13 is a schematic diagram showing the configuration of the first layer of the antenna device 1200. In FIG. 13, in order to make the correlation with FIGS. 12A and 12B easier to understand, the outer shape of a reflection plate 1230 constituting the fourth layer is shown with a broken line. An excitation element 1201, an excitation element 1203, an excitation element 1205, an excitation element 1206, an excitation element 1207, a resonance element 1202, and a resonance element 1204 are provided on the first layer. The excitation element 1206 and the excitation element 1207 are connected via a trap circuit 1208*a*. The excitation element 1207 and the excitation element 1203 are connected via a trap circuit 1208*b*. The excitation element 1203 and the excitation element 1201 are connected via a trap circuit 1210. The excitation element 1203 and the excitation element 1205 are connected via a trap circuit 1209.

In the present embodiment, the excitation element 1201, the excitation element 1203, and the excitation element 1205 each have a loop shape. Further, the resonance element 1202 is provided inside the excitation element 1201. The resonance element 1204 is provided inside the excitation element 1203. The resonance element 1204 is an example of a first resonance element. The resonance element 1202 is an example of a third resonance element.

Figure 14:
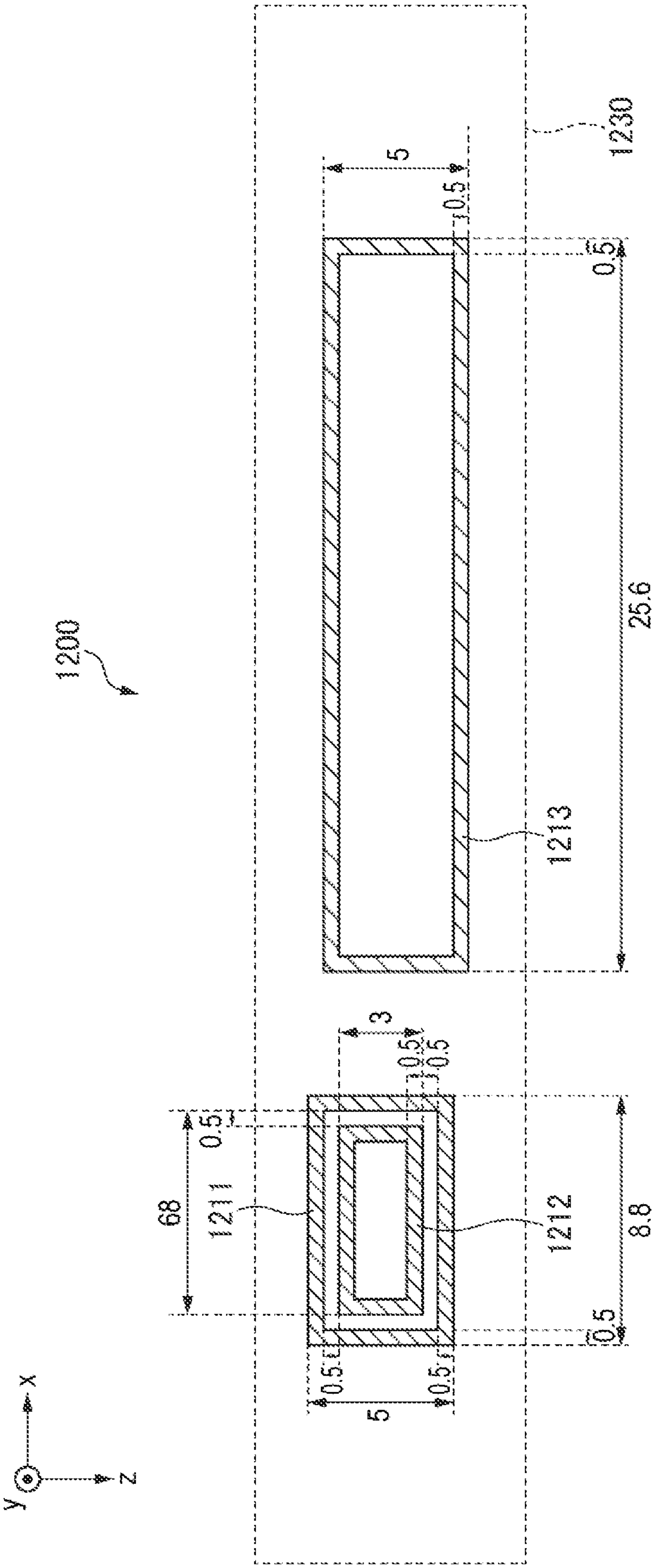
FIG. 14 is a schematic diagram showing a specific example of the antenna device according to Embodiment 3.

FIG. 14 is a schematic diagram showing the configuration of the second layer of the antenna device 1200. In FIG. 14, in order to make the correlation with FIGS. 12A and 12B easier to understand, the outer shape of the reflection plate 1230 constituting the fourth layer is shown with a broken line. A resonance element 1211, a resonance element 1212, and a resonance element 1213 are provided in the second layer. In the present embodiment, the resonance element 1211, the resonance element 1212, and the resonance element 1213 each have a loop shape. The resonance element 1212 is provided inside the resonance element 1211. The resonance element 1213 is an example of the first resonance element. The resonance element 1211 and the resonance element 1212 are an example of the third resonance element.

Figure 15:
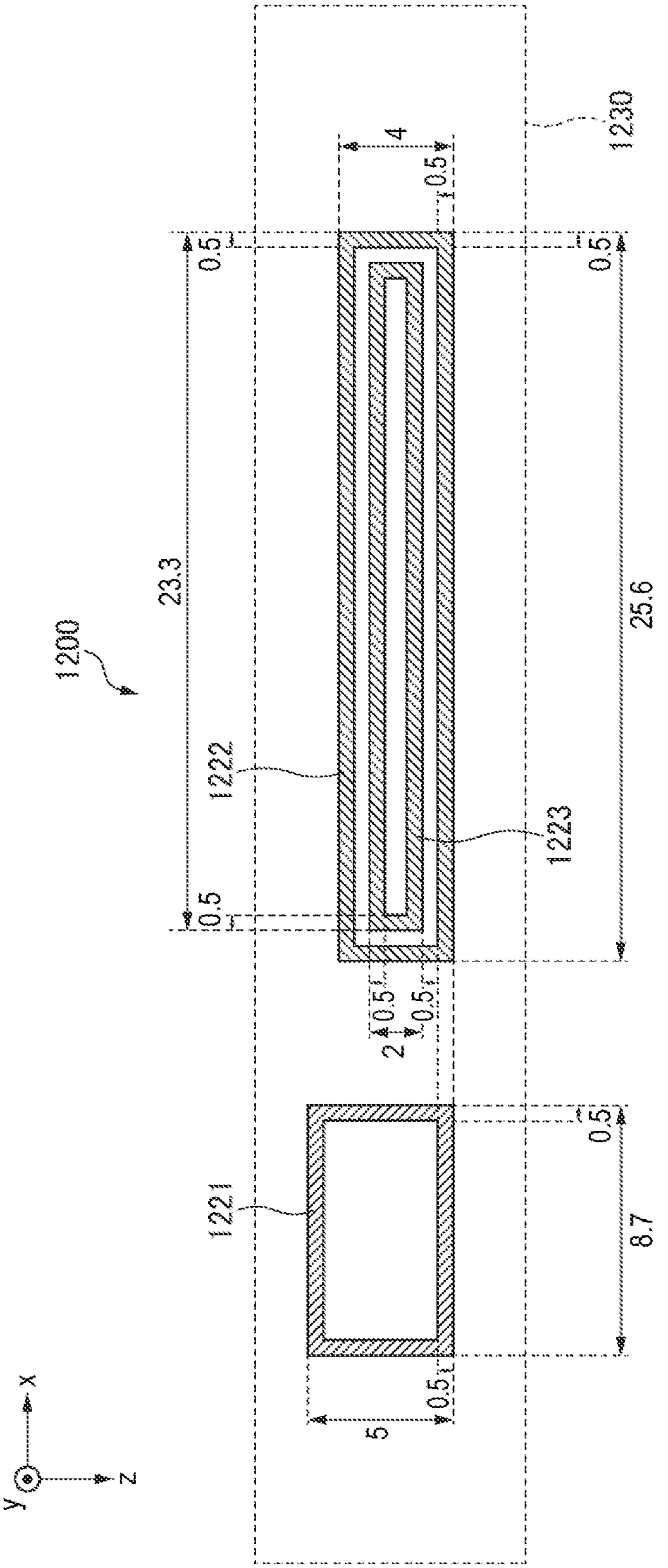
FIG. 15 is a schematic diagram showing a specific example of the antenna device according to Embodiment 3.

FIG. 15 is a schematic diagram showing the configuration of the third layer of the antenna device 1200. In FIG. 15, in order to make the correlation with FIGS. 12A and 12B easier to understand, the outer shape of the reflection plate 1230 constituting the fourth layer is shown with a broken line. A resonance element 1221, a resonance element 1222, and a resonance element 1223 are provided in the third layer. In the present embodiment, the resonance element 1221, the resonance element 1222, and the resonance element 1223 each have a loop shape. The resonance element 1223 is provided inside the resonance element 1222. The resonance element 1222 and the resonance element 1223 are an example of the first resonance element. The resonance element 1221 is an example of the third resonance element.

The fourth layer of the antenna device 1200 is the reflection plate 1230. The reflection plate 1230 has a rectangular shape and is, for example, 9×70.5 mm.

In the antenna device 1200, the layer structure corresponding to the 2.4 GHz band is a layer including the excitation element 1205, the resonance element 1213, the resonance element 1222, and the resonance element 1223. In the antenna device 1200, the layer structure corresponding to the 5 GHz band is a layer including the excitation element 1201, the resonance element 1202, the resonance element 1211, the resonance element 1212, and the resonance element 1221. In the configuration example of the antenna device 1200 in FIGS. 12A to 15, an example is shown in which the excitation element 1203 and the excitation element 1201 are connected via the trap circuit 1210. In addition, the trap circuit 1210 may be removed and the excitation element 1201 may be operated as a resonance element. The excitation element 1201 and the resonance element 1202 may be removed. In this case, the resonance element 1211 and the resonance element 1212 of the second layer can also operate as the resonance element of the excitation element 1203 of the first layer.

(Reference Example of Antenna Device that does not Implement Invention in Present Disclosure)

Figure 16A:
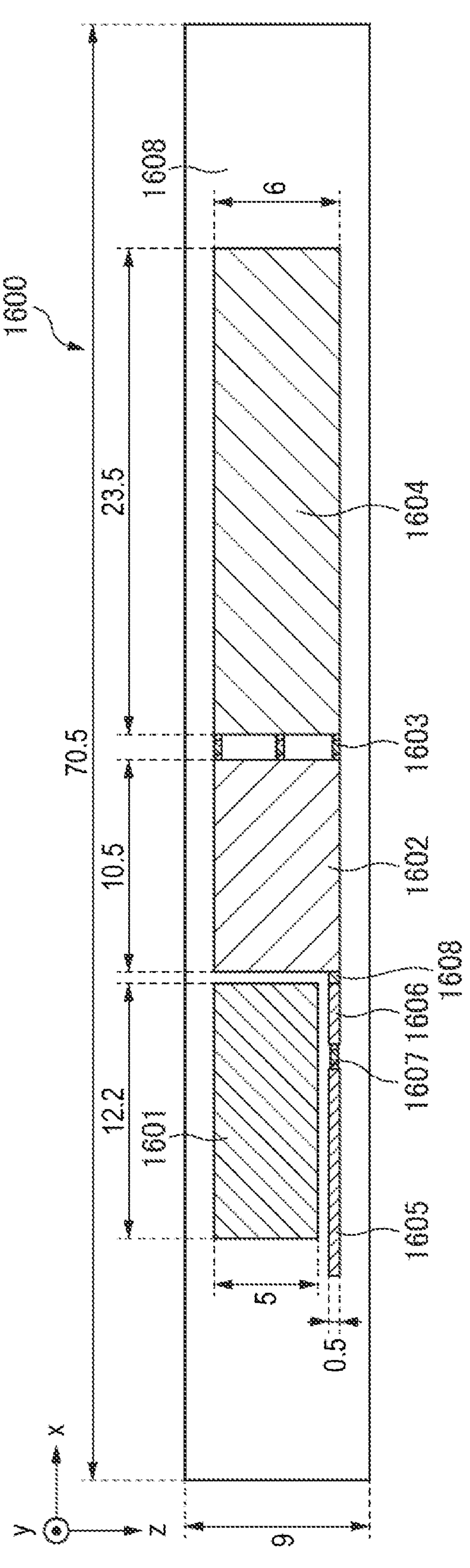
FIGS. 16A and 16B are schematic diagrams showing a reference example of an antenna device that does not implement the invention in the present disclosure.
Figure 16B:
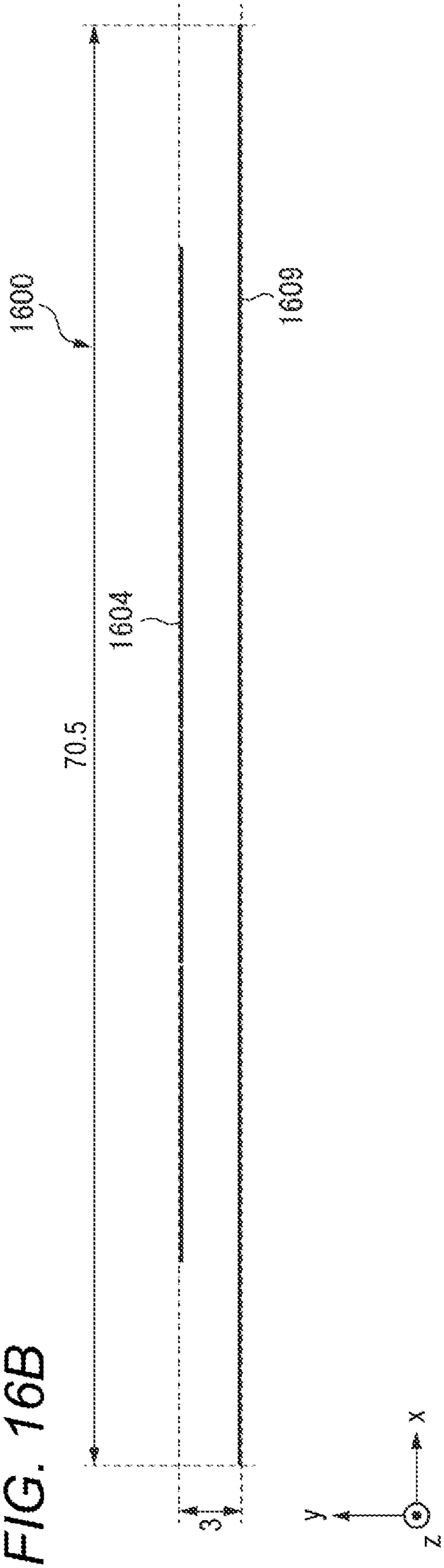

FIGS. 16A and 16B show a reference example of an antenna device that does not implement the invention in the present disclosure. FIG. 16A is a schematic top view when an antenna device 1600 is viewed from the front side along the y axis direction, and FIG. 16B is a schematic cross-sectional view when the antenna device 1600 is viewed from the side surface side along the z axis direction. Numerical values of dimensions shown in FIGS. 16A and 16B are shown in units of "millimeters (mm)" as in FIGS. 12A and 12B. Here, a reflection plate 1609 has a rectangular shape, and is, for example, 9×70.5 mm. The thickness of the antenna device 1600 is, for example, 3 mm. This is the same as the dimension of the antenna device 1200 according to the present embodiment shown in FIGS. 12A and 12B.

An excitation element 1602, an excitation element 1604, an excitation element 1605, an excitation element 1606, and a resonance element 1601 are provided on the surface layer of the antenna device 1600. The excitation element 1605 and the excitation element 1606 are connected via a trap circuit 1607. The excitation element 1602 and the excitation element 1606 are connected via a trap circuit 1608. The excitation element 1602 and the excitation element 1604 are connected via a trap circuit 1603.

In the antenna device 1600, both the excitation element and the resonance element are formed in a plate shape.

[Frequency Characteristics]

Figure 17:
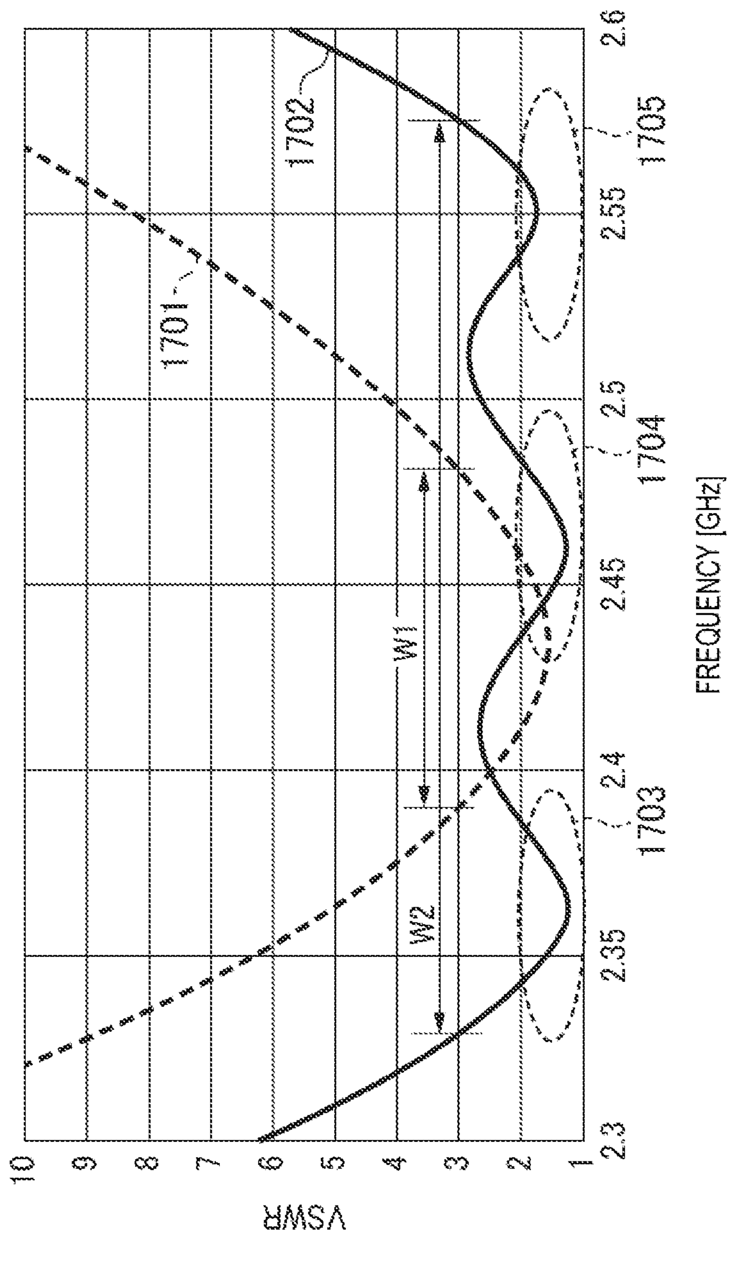
FIG. 17 is a diagram showing frequency characteristics of the antenna device according to Embodiment 3.

FIG. 17 is a diagram showing frequency characteristics of the antenna device 1200 according to the present embodiment. In FIG. 17, the horizontal axis indicates the frequency, and the vertical axis indicates the VSWR. Here, the frequency characteristics of the 2.4 GHz band will be described as an example. The frequency characteristics of the 2.4 GHz band are achieved by providing the excitation element 1205, the resonance element 1213, the resonance element 1222, and the resonance element 1223 shown in FIGS. 12A to 15 in the antenna device 1200.

In FIG. 17, a broken line 1701 indicates frequency characteristics provided based on the antenna device 1600 shown in FIGS. 16A and 16B. A frequency bandwidth W1 is a frequency bandwidth in which the VSWR value satisfies 3 in the antenna device 1600. A frequency bandwidth W2 is a frequency bandwidth in which the VSWR value satisfies 3 in the antenna device 1200. A solid line 1702 indicates frequency characteristics achieved by providing the excitation element 1205, the resonance element 1213, the resonance element 1222, and the resonance element 1223 in the antenna device 1200 according to the present embodiment shown in FIGS. 12A to 15. When the frequency bandwidth W1 and the frequency bandwidth W2 are compared, it can be seen that the antenna device 1200 can extend the frequency band in which the VSWR value satisfies 3 in the 2.4 GHz band. Specifically, the range indicated by a broken line 1703 is achieved by providing a resonance element 1022 and the resonance element 1223 in the antenna device 1200. The range indicated by a broken line 1704 is achieved by providing the resonance element 1213 in the antenna device 1200. The range indicated by a broken line 1705 is achieved by providing the excitation element 1205 in the antenna device 1200. As a result, the frequency bandwidth is extended.

As described above, according to the present embodiment, in the antenna device (for example, the antenna device 1200), the antenna element (for example, the excitation element 1201, the excitation element 1203, the excitation element 1205, the excitation element 1206, and the excitation element 1207) and the first resonance element (for example, the resonance element 1222 and the resonance element 1223) are provided at an interval that allows electromagnetic coupling, the first resonance element resonates in the first frequency band when electromagnetically coupled to the antenna element, the antenna element and the third resonance element (for example, the resonance element 1221) are provided at an interval that allows electromagnetic coupling, the third resonance element resonates in the second frequency band when electromagnetically coupled to the antenna element, the first frequency band is the 2.4 GHz band, and the second frequency band is the 5 GHz band. Accordingly, it is possible to provide an antenna configuration capable of achieving both the size reduction and performance improvement of the antenna device. In particular, it is possible to perform antenna design assuming a predetermined frequency characteristic without enlarging an antenna device for a plurality of different frequency bands.

Other Embodiments

The antenna device according to the above embodiment has been described using an example of an antenna device that is capable of both transmitting and receiving the electromagnetic wave. Alternatively, the present invention may be applied to, for example, an antenna device only for transmission or only for reception.

In the present specification, expressions "first", "second", and "third" are merely used to distinguish from other components, and are not intended to be construed as being limited to only specific components. Therefore, these expressions may be read as appropriate depending on the combination of the components.

Although various embodiments have been described above with reference to the drawings, it is needless to say that the present disclosure is not limited to such examples. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, the components in the various embodiments described above may be combined freely in a range without deviating from the spirit of the invention.

(Note)

The following techniques are disclosed based on the above description of the embodiments.

(Technique 1)

An antenna device including: a dielectric layer including a dielectric; an antenna element that is located on a surface of the dielectric layer and that has a loop shape; a radio frequency input element through which radio frequency is supplied to the antenna element; and at least one resonance element that is located inside the dielectric layer.

According to this configuration, it is possible to provide an antenna configuration capable of achieving both the size reduction and performance improvement of the antenna device.

(Technique 2)

The antenna device according to technique 1, in which the at least one resonance element includes a first resonance element having a loop shape.

According to this configuration, it is possible to provide an antenna configuration capable of achieving both the size reduction and performance improvement of the antenna device.

(Technique 3)

The antenna device according to technique 2, further including: a reflection plate, in which the reflection plate and the antenna element are configured to sandwich the dielectric layer, the at least one resonance element includes a second resonance element that is located between the first resonance element and the reflection plate and that has a loop shape, and a shortest distance from an inner diameter of the second resonance element to an outer diameter of the second resonance element is longer than a shortest distance from an inner diameter of the first resonance element to an outer diameter of the first resonance element.

According to this configuration, it is possible to improve the gain of the antenna device and to extend the frequency bandwidth.

(Technique 4)

The antenna device according to technique 1, further including: a reflection plate, in which the reflection plate and the antenna element are configured to sandwich the dielectric layer, the at least one resonance element includes a first resonance element and a second resonance element that is located between the first resonance element and the reflection plate, the first resonance element has a rectangular shape having a first short side, the second resonance element has a rectangular shape having a second short side, and the second short side is longer than the first short side.

According to this configuration, it is possible to improve the gain of the antenna device and to extend the frequency bandwidth.

(Technique 5)

The antenna device according to any one of techniques 1 to 4, in which the antenna element and the at least one resonance element are provided at an interval that allows electromagnetic coupling, and the at least one resonance element resonates at a predetermined frequency when electromagnetically coupled with the antenna element.

According to this configuration, the frequency bandwidth of the polarized wave emitted by the antenna device can be extended.

(Technique 6)

The antenna device according to technique 5, further including: a reflection plate, in which the reflection plate and the antenna element are configured to sandwich the dielectric layer, the at least one resonance element includes a first resonance element and a second resonance element that is located between the first resonance element and the reflection plate, and a frequency at which the second resonance element resonates is higher than a frequency at which the first resonance element resonates.

According to this configuration, it is possible to provide an antenna configuration capable of achieving both the size reduction and performance improvement of the antenna device.

(Technique 7)

The antenna device according to technique 1, further including: a reflection plate, in which the reflection plate and the antenna element are configured to sandwich the dielectric layer, the dielectric layer includes a first dielectric layer and a second dielectric layer that is located between the first dielectric layer and the reflection plate, and a relative permittivity of the second dielectric layer is higher than a relative permittivity of the first dielectric layer.

According to this configuration, it is possible to provide an antenna configuration capable of achieving both the size reduction and performance improvement of the antenna device.

(Technique 8)

The antenna device according to technique 1, further including: a reflection plate, in which the reflection plate and the antenna element are configured to sandwich the dielectric layer, the least one resonance element includes a first resonance element and a third resonance element, and a shortest distance between the first resonance element and the reflection plate is equal to a shortest distance between the third resonance element and the reflection plate.

According to this configuration, it is possible to provide an antenna configuration capable of achieving both the size reduction and performance improvement of the antenna device.

(Technique 9)

The antenna device according to any one of techniques 1 to 8, in which the dielectric layer includes a plurality of regions having different relative permittivities.

According to this configuration, it is possible to make the gain of the antenna device close to a desired value by appropriately adjusting the relative permittivities in the regions.

(Technique 10)

The antenna device according to technique 8, in which the antenna element and the first resonance element are provided at an interval that allows electromagnetic coupling, the first resonance element resonates at a frequency in a first frequency band when electromagnetically coupled to the antenna element, the antenna element and the third resonance element are provided at an interval that allows electromagnetic coupling, the third resonance element resonates at a frequency in a second frequency band when electromagnetically coupled to the antenna element, the first frequency band is a 2.4 GHz band, and the second frequency band is a 5 GHz band.

According to this configuration, it is possible to provide an antenna configuration capable of achieving both the size reduction and performance improvement of the antenna device. In particular, it is possible to provide an antenna device that is compatible with the frequency bands of the 2.4 GHz band and the 5 GHz band and that has a configuration capable of achieving both size reduction and performance improvement.

INDUSTRIAL APPLICABILITY

The present disclosure is useful as an antenna device and a communication device including an antenna device.

CROSS-REFERENCE TO RELATED APPLICATIONS

This application is based on and claims priority under 35 USC 119 from Japanese Patent Application No. 2023-053887 filed on Mar. 29, 2023, the contents of which are incorporated herein by reference.

What is claimed is:

1. An antenna device comprising:
a dielectric layer including a dielectric;
an antenna element that is located on a surface of the dielectric layer and that has a loop shape;
a radio frequency input element through which radio frequency is supplied to the antenna element; and
at least one resonance element that is located inside the dielectric layer, wherein
the at least one resonance element includes a first resonance element having a loop shape and a second resonance element having a loop shape, the first resonance element being located between the antenna element and the second resonance element, and
a shortest distance from an inner diameter of the second resonance element to an outer diameter of the second resonance element is longer than a shortest distance from an inner diameter of the first resonance element to an outer diameter of the first resonance element.

2. The antenna device according to claim 1, further comprising:
a reflection plate, wherein
the reflection plate and the antenna element are configured to sandwich the dielectric layer, and
the second resonance element is located between the first resonance element and the reflection plate.

3. The antenna device according to claim 2,
wherein a shortest distance between the first resonance element and the second resonance element is 2 mm or less.

4. The antenna device according to claim 2,
wherein the reflection plate is a metal plate.

5. The antenna device according to claim 1,
wherein the antenna element and the at least one resonance element are provided at an interval that allows electromagnetic coupling, and
the at least one resonance element resonates at a predetermined frequency when electromagnetically coupled with the antenna element.

6. The antenna device according to claim 5, further comprising:
a reflection plate, wherein
the reflection plate and the antenna element are configured to sandwich the dielectric layer,
the second resonance element is located between the first resonance element and the reflection plate, and
a frequency at which the second resonance element resonates is higher than a frequency at which the first resonance element resonates.

7. The antenna device according to claim 6, further comprising:
a third resonance element that is located between the second resonance element and the reflection plate,
wherein a frequency at which the third resonance element resonates is higher than a frequency at which the second resonance element resonates.

8. The antenna device according to claim 1, further comprising:
a reflection plate, wherein
the reflection plate and the antenna element are configured to sandwich the dielectric layer,
wherein the dielectric layer includes a first dielectric layer and a second dielectric layer that is located between the first dielectric layer and the reflection plate, and
a relative permittivity of the second dielectric layer is higher than a relative permittivity of the first dielectric layer.

9. The antenna device according to claim 8,
wherein the dielectric layer further includes a third dielectric layer that is located between the second dielectric layer and the reflection plate, and
a relative permittivity of the third dielectric layer is higher than a relative permittivity of the second dielectric layer.

10. The antenna device according to claim 1, further comprising:
a reflection plate, wherein
the reflection plate and the antenna element are configured to sandwich the dielectric layer,
the at least one resonance element includes a third resonance element, and
a shortest distance between the first resonance element and the reflection plate is equal to a shortest distance between the third resonance element and the reflection plate.

11. The antenna device according to claim 10,
wherein the antenna element and the first resonance element are provided at an interval that allows electromagnetic coupling,
the first resonance element resonates at a frequency in a first frequency band when electromagnetically coupled to the antenna element,
the antenna element and the third resonance element are provided at an interval that allows electromagnetic coupling,
the third resonance element resonates at a frequency in a second frequency band when electromagnetically coupled to the antenna element,
the first frequency band is a 2.4 GHz band, and
the second frequency band is a 5 GHz band.

12. The antenna device according to claim 1,
wherein the dielectric layer includes a plurality of regions having different relative permittivities.

13. The antenna device according to claim 1,
wherein the antenna element and the radio frequency input element are connected via a trap circuit including a capacitor and a coil.

14. An antenna device comprising:
a dielectric layer including a dielectric;
an antenna element that is located on a surface of the dielectric layer and that has a loop shape;
a radio frequency input element through which radio frequency is supplied to the antenna element; and
at least one resonance element that is located inside the dielectric layer, wherein
the at least one resonance element includes a first resonance element and a second resonance element, the first resonance element being located between the antenna element and the second resonance element,
the first resonance element has a rectangular shape having a first short side, the second resonance element has a rectangular shape having a second short side, and the second short side is longer than the first short side.

15. The antenna device according to claim 14, further comprising;

a reflection plate, wherein the reflection plate and the antenna element are configured to sandwich the dielectric layer, and the second resonance element is located between the first resonance element and the reflection plate.

* * * * *